United States Patent
Pallotta et al.

(10) Patent No.: US 7,622,175 B2
(45) Date of Patent: *Nov. 24, 2009

(54) ARTICLES AND METHODS FOR APPLYING COLOR ON SURFACES

(75) Inventors: Shawn Christopher Pallotta, Maineville, OH (US); Von Adoniram Kinsey, Loveland, OH (US); Michael John O'Brien, Cincinnati, OH (US); Robert Lawrence Prosise, Cincinnati, OH (US); John William Toussant, West Chester, OH (US); Andrew Julian Wnuk, Wyoming, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 354 days.

This patent is subject to a terminal disclaimer.

(21) Appl. No.: 10/324,237

(22) Filed: Dec. 19, 2002

(65) Prior Publication Data

US 2003/0134114 A1    Jul. 17, 2003

Related U.S. Application Data

(60) Provisional application No. 60/343,146, filed on Dec. 20, 2001, provisional application No. 60/380,225, filed on May 13, 2002, provisional application No. 60/380,205, filed on May 13, 2002.

(51) Int. Cl.
*B32B 9/00* (2006.01)
*B32B 33/00* (2006.01)
*B32B 7/12* (2006.01)

(52) U.S. Cl. .................... 428/40.1; 428/40.2; 428/41.6; 428/42.1; 428/343; 428/354; 428/904.4; 428/914

(58) Field of Classification Search ............... 428/40.1, 428/40.2, 41.3, 41.6, 42.1, 213, 214, 131, 428/343, 354, 914, 904.4
See application file for complete search history.

(56) References Cited

U.S. PATENT DOCUMENTS 1,365,715 A    1/1921    Morrison (Continued)

FOREIGN PATENT DOCUMENTS

DE    22 54 430    5/1974

(Continued)

OTHER PUBLICATIONS

U.S. Appl. No. 11/393,506, filed Mar. 30, 2006, Kinsey et al.

(Continued)

*Primary Examiner*—Patricia L Nordmeyer
(74) *Attorney, Agent, or Firm*—Larry L. Huston; Jeffrey V Bamber; Leonard W Lewis (57) ABSTRACT

Articles for applying color on a surface comprise a sheet of dry color component and an adhesive on one surface of the sheet of dry color component. In one embodiment, the article is free of a releasable liner and a carrier sheet. In another embodiment, the sheet of dry color component and adhesive have a combined thickness of about 3 mils or less. Methods for providing a substantially permanent color effect on an architectural surface comprise applying dry color component to the architectural surface.

22 Claims, 3 Drawing Sheets

U.S. PATENT DOCUMENTS

| | | |
|---|---|---|
| 2,746,893 A | 5/1956 | Matthes |
| 3,152,030 A * | 10/1964 | Sampson .................... 156/278 |
| 3,301,741 A | 1/1967 | Henrickson et al. |
| 3,314,838 A | 4/1967 | Erwin |
| 3,331,729 A | 7/1967 | Danielson et al. |
| 3,616,192 A | 10/1971 | Sinclair |
| 3,640,791 A | 2/1972 | Rosenheim |
| 3,654,044 A | 4/1972 | Hirota |
| 3,666,516 A | 5/1972 | Dunning |
| 3,671,236 A | 6/1972 | Van Beusekom |
| 3,741,786 A * | 6/1973 | Torrey ....................... 428/41.9 |
| 3,743,086 A | 7/1973 | Aldrich |
| 3,804,700 A | 4/1974 | Hoey |
| 3,870,593 A | 3/1975 | Elton et al. |
| 3,896,249 A | 7/1975 | Keeling et al. |
| 3,900,644 A | 8/1975 | Sackoff et al. |
| 3,900,645 A | 8/1975 | Morgan |
| 3,916,046 A | 10/1975 | Youngberg |
| 3,933,702 A | 1/1976 | Caimi et al. |
| 4,037,008 A | 7/1977 | Tugwell |
| 4,054,697 A | 10/1977 | Reed et al. |
| 4,068,033 A | 1/1978 | Meade |
| 4,094,690 A | 6/1978 | Morton |
| 4,151,319 A | 4/1979 | Sackoff et al. |
| 4,175,156 A | 11/1979 | Ikins |
| 4,205,107 A | 5/1980 | Jaschke et al. |
| 4,210,485 A | 7/1980 | Lake |
| 4,232,077 A | 11/1980 | Meisel |
| 4,235,657 A | 11/1980 | Greenman et al. |
| 4,241,129 A | 12/1980 | Marton et al. |
| 4,248,762 A | 2/1981 | Hornibrook et al. |
| 4,248,917 A | 2/1981 | Hornibrook et al. |
| 4,256,794 A | 3/1981 | Meisel |
| 4,258,096 A | 3/1981 | LaMarche |
| 4,262,051 A | 4/1981 | Welz et al. |
| 4,298,647 A | 11/1981 | Cancio et al. |
| 4,369,157 A | 1/1983 | Conner |
| 4,376,151 A | 3/1983 | Parrotta |
| 4,376,159 A | 3/1983 | Spechler |
| 4,377,050 A | 3/1983 | Renholts |
| 4,451,522 A | 5/1984 | de Vroon |
| 4,499,130 A | 2/1985 | Questel et al. |
| 4,514,457 A | 4/1985 | Sasaki |
| 4,517,044 A | 5/1985 | Arnold |
| 4,524,097 A | 6/1985 | Graham |
| 4,550,683 A | 11/1985 | Jones |
| 4,555,441 A | 11/1985 | Rothenberg |
| 4,555,471 A | 11/1985 | Barzynski et al. |
| 4,556,595 A | 12/1985 | Ochi |
| 4,560,587 A | 12/1985 | Sasaki |
| 4,564,406 A | 1/1986 | Binks |
| 4,598,020 A | 7/1986 | Panush |
| 4,650,704 A | 3/1987 | Rothenberg |
| 4,661,182 A | 4/1987 | Lerner |
| 4,737,225 A | 4/1988 | Waugh et al. |
| 4,759,441 A | 7/1988 | Leurck |
| 4,783,354 A | 11/1988 | Fagan |
| 4,786,537 A | 11/1988 | Sasaki |
| 4,818,589 A | 4/1989 | Johnson et al. |
| 4,854,610 A | 8/1989 | Kwiatek |
| 4,871,618 A | 10/1989 | Kinneberg et al. |
| 4,888,244 A | 12/1989 | Masubuchi et al. |
| 4,894,274 A | 1/1990 | Graham et al. |
| 4,902,557 A | 2/1990 | Rohrbacher |
| 4,919,994 A | 4/1990 | Incremona et al. |
| 4,999,076 A | 3/1991 | Incremona et al. |
| 5,000,810 A | 3/1991 | Silverstein |
| 5,034,269 A | 7/1991 | Wheeler |
| 5,045,569 A | 9/1991 | Delgado |
| 5,073,422 A | 12/1991 | Konno et al. |
| 5,073,457 A | 12/1991 | Blackwell |
| 5,075,149 A | 12/1991 | Owens et al. |
| 5,084,317 A | 1/1992 | Epple |
| 5,114,514 A | 5/1992 | Landis |
| 5,134,012 A | 7/1992 | Arakawa et al. |
| 5,135,798 A | 8/1992 | Muschter et al. |
| 5,141,584 A | 8/1992 | Schuh et al. |
| 5,141,790 A | 8/1992 | Calhoun et al. |
| 5,169,474 A | 12/1992 | Binder |
| 5,183,696 A | 2/1993 | Sanderson |
| 5,192,612 A | 3/1993 | Otter et al. |
| 5,196,246 A | 3/1993 | Kauss et al. |
| 5,198,301 A | 3/1993 | Hager et al. |
| 5,203,941 A | 4/1993 | Spain et al. |
| 5,215,826 A | 6/1993 | Shimanski et al. |
| 5,229,207 A | 7/1993 | Paquette et al. |
| 5,250,336 A | 10/1993 | Greuse et al. |
| 5,266,372 A | 11/1993 | Arakawa et al. |
| 5,308,694 A | 5/1994 | Andersson |
| 5,316,843 A | 5/1994 | Kiryu et al. |
| 5,322,708 A | 6/1994 | Eissele |
| 5,342,666 A | 8/1994 | Ellison et al. |
| 5,346,766 A | 9/1994 | Otter et al. |
| 5,413,829 A | 5/1995 | Brown et al. |
| 5,430,904 A | 7/1995 | Ono et al. |
| 5,441,784 A | 8/1995 | Smith |
| 5,451,440 A | 9/1995 | Tynan, Jr. |
| 5,460,855 A | 10/1995 | Andersson |
| 5,468,532 A | 11/1995 | Ho et al. |
| 5,476,901 A | 12/1995 | Smith et al. |
| 5,482,182 A | 1/1996 | Thompson et al. |
| 5,487,929 A | 1/1996 | Rusincovitch, Jr. et al. |
| 5,489,359 A | 2/1996 | Yamane |
| 5,490,893 A | 2/1996 | Enlow et al. |
| 5,498,305 A | 3/1996 | Mailloux |
| 5,506,031 A | 4/1996 | Spain et al. |
| 5,518,786 A | 5/1996 | Johnson et al. |
| 5,523,129 A | 6/1996 | McGeehan-Hatch |
| 5,571,557 A | 11/1996 | De Bastiani et al. |
| 5,573,865 A | 11/1996 | Steelman et al. |
| 5,591,290 A | 1/1997 | Walter et al. |
| 5,595,626 A | 1/1997 | Yokouchi et al. |
| 5,620,772 A | 4/1997 | Taniguchi |
| 5,633,078 A | 5/1997 | Kamiyama |
| 5,633,225 A | 5/1997 | Fredj et al. |
| 5,639,539 A | 6/1997 | DeProspero et al. |
| 5,641,835 A | 6/1997 | Smith et al. |
| 5,643,668 A | 7/1997 | Calhoun et al. |
| 5,658,646 A | 8/1997 | Takano et al. |
| 5,662,977 A | 9/1997 | Spain et al. |
| 5,665,458 A | 9/1997 | Mahn, Jr. |
| 5,670,014 A | 9/1997 | Mendelovich et al. |
| 5,676,787 A | 10/1997 | Rusincovitch et al. |
| 5,681,631 A | 10/1997 | Steelman et al. |
| 5,683,805 A | 11/1997 | Oita et al. |
| 5,707,482 A * | 1/1998 | Fusselman .................. 156/577 |
| 5,707,697 A | 1/1998 | Spain et al. |
| 5,725,712 A | 3/1998 | Spain et al. |
| 5,728,469 A | 3/1998 | Mann et al. |
| 5,741,620 A | 4/1998 | Holmes et al. |
| 5,750,234 A | 5/1998 | Johnson et al. |
| 5,750,254 A | 5/1998 | Starkey |
| 5,773,112 A | 6/1998 | Tachikawa et al. |
| 5,785,790 A | 7/1998 | Olsen et al. |
| 5,788,796 A | 8/1998 | Look et al. |
| 5,795,636 A | 8/1998 | Keller et al. |
| 5,814,402 A | 9/1998 | Smith |
| 5,851,931 A | 12/1998 | DeRenzo et al. |
| 5,852,121 A | 12/1998 | Steelman et al. |
| 5,853,876 A | 12/1998 | Takano et al. |
| 5,866,220 A | 2/1999 | Rusincovitch et al. |
| 5,891,294 A | 4/1999 | Shih et al. |
| 5,897,742 A | 4/1999 | Semmler |
| 5,904,968 A | 5/1999 | Langan |

| | | |
|---|---|---|
| 5,906,883 A | 5/1999 | Blanc-Brude |
| 5,916,643 A | 6/1999 | Spain et al. |
| 5,919,537 A | 7/1999 | Niazy |
| 5,939,479 A | 8/1999 | Reaves et al. |
| 5,985,079 A | 11/1999 | Ellison |
| 5,989,707 A | 11/1999 | Takizawa et al. |
| 6,020,062 A | 2/2000 | Questel et al. |
| 6,042,678 A | 3/2000 | Johnson |
| 6,083,616 A | 7/2000 | Dressler |
| 6,086,995 A | 7/2000 | Smith |
| 6,096,396 A | 8/2000 | Patton et al. |
| 6,129,965 A | 10/2000 | Langan |
| 6,153,283 A | 11/2000 | Pierson et al. |
| 6,193,918 B1 | 2/2001 | McGuir et al. |
| 6,194,064 B1 | 2/2001 | Keely et al. |
| 6,214,453 B1 | 4/2001 | Kano |
| 6,214,485 B1 | 4/2001 | Barnett et al. |
| 6,221,198 B1 | 4/2001 | Gryska et al. |
| 6,221,485 B1 | 4/2001 | Sanchez et al. |
| 6,228,486 B1 | 5/2001 | Kittel et al. |
| 6,235,363 B1 | 5/2001 | Bilodeau |
| 6,248,427 B1 | 6/2001 | Ast |
| 6,296,732 B1 | 10/2001 | Enlow et al. |
| 6,311,399 B1 | 11/2001 | Steelman et al. |
| 6,312,777 B1 | 11/2001 | Smith |
| 6,322,874 B1 | 11/2001 | Steelman et al. |
| 6,324,811 B1 | 12/2001 | Gauss et al. |
| 6,336,988 B1 | 1/2002 | Enlow et al. |
| 6,349,754 B1 | 2/2002 | Johnson et al. |
| 6,352,769 B1 | 3/2002 | Mori |
| 6,364,992 B1 | 4/2002 | Nambu et al. |
| 6,376,058 B1 | 4/2002 | Schut et al. |
| 6,379,791 B1 | 4/2002 | Cernohous et al. |
| 6,383,613 B1 | 5/2002 | Takeda |
| 6,394,165 B1 | 5/2002 | Rader |
| 6,399,193 B1 | 6/2002 | Ellison |
| 6,413,630 B1 | 7/2002 | Nakayama |
| 6,432,241 B1 | 8/2002 | Congard et al. |
| 6,432,528 B1 | 8/2002 | Faust et al. |
| 6,447,630 B1 | 9/2002 | Disano et al. |
| 6,461,422 B1 | 10/2002 | Yang et al. |
| 6,474,389 B1 | 11/2002 | Steelman et al. |
| 6,475,616 B1 | 11/2002 | Dietz et al. |
| 6,482,488 B1 | 11/2002 | Janssen et al. |
| 6,482,638 B1 | 11/2002 | Patil et al. |
| 6,493,918 B1 | 12/2002 | Bell et al. |
| 6,509,075 B1 | 1/2003 | McCurry et al. |
| 6,514,624 B2 | 2/2003 | Takemoto |
| 6,520,234 B1 | 2/2003 | Anderson et al. |
| 6,521,337 B2 | 2/2003 | Yanagiuchi |
| 6,541,109 B1 | 4/2003 | Kumar et al. |
| 6,554,044 B2 | 4/2003 | Paulson et al. |
| 6,576,327 B1 | 6/2003 | Weissmann et al. |
| 6,579,601 B2 | 6/2003 | Kollaja et al. |
| 6,613,181 B2 | 9/2003 | Steelman et al. |
| 6,613,411 B2 | 9/2003 | Kollaja et al. |
| 6,617,008 B1 | 9/2003 | Kono et al. |
| 6,630,049 B2 | 10/2003 | Hannington et al. |
| 6,645,328 B2 | 11/2003 | Anderson et al. |
| 6,649,003 B1 | 11/2003 | Spain et al. |
| 6,649,682 B1 | 11/2003 | Breton et al. |
| 6,680,104 B2 | 1/2004 | Boris et al. |
| 6,703,089 B2 * | 3/2004 | DeProspero et al. ..... 428/32.76 |
| 6,706,131 B2 | 3/2004 | Steelman et al. |
| 6,709,723 B2 * | 3/2004 | Roys et al. .................... 428/31 |
| 6,723,427 B1 * | 4/2004 | Johnson et al. ............. 428/343 |
| 6,740,379 B1 | 5/2004 | Congard et al. |
| 6,756,095 B2 | 6/2004 | Sandt et al. |
| 6,773,653 B2 | 8/2004 | Miller et al. |
| 6,783,816 B2 | 8/2004 | Golub et al. |
| 6,805,048 B2 | 10/2004 | Pearson et al. |
| 6,808,586 B1 | 10/2004 | Steinhardt |
| 6,824,638 B1 | 11/2004 | Anderson et al. |
| 6,866,383 B2 | 3/2005 | Naik et al. |
| 6,872,268 B2 | 3/2005 | David et al. |
| 6,875,800 B2 | 4/2005 | Vanier et al. |
| 6,916,532 B2 | 7/2005 | Yanagiuchi |
| 6,929,846 B2 | 8/2005 | Kamiyama |
| 6,955,124 B2 | 10/2005 | Ciaramitaro et al. |
| 6,984,429 B2 | 1/2006 | Thunhorst et al. |
| 7,141,133 B2 | 11/2006 | Kesti et al. |
| 2001/0006714 A1 | 7/2001 | Bull et al. |
| 2002/0127361 A1 | 9/2002 | Sandt et al. |
| 2002/0142155 A1 | 10/2002 | Steinberg |
| 2002/0182955 A1 | 12/2002 | Weglewski et al. |
| 2002/0197398 A1 | 12/2002 | Scholz et al. |
| 2003/0026932 A1 | 2/2003 | Johnson et al. |
| 2003/0116265 A1 | 6/2003 | Anderson et al. |
| 2003/0150547 A1 | 8/2003 | Kesti et al. |
| 2003/0157287 A1 | 8/2003 | Song |
| 2003/0211334 A1 | 11/2003 | Jones |
| 2004/0076788 A1 * | 4/2004 | Steinhardt et al. ............. 428/57 |
| 2004/0101647 A1 | 5/2004 | Pitzen |
| 2004/0126529 A1 | 7/2004 | Squier et al. |
| 2004/0159969 A1 | 8/2004 | Truog et al. |
| 2004/0161564 A1 | 8/2004 | Truog et al. |
| 2004/0161566 A1 | 8/2004 | Truog et al. |
| 2004/0161567 A1 | 8/2004 | Truog et al. |
| 2004/0161568 A1 | 8/2004 | Truog et al. |
| 2004/0170855 A1 | 9/2004 | Kawabata |
| 2004/0200564 A1 * | 10/2004 | Kinsey et al. ................ 156/230 |
| 2004/0247837 A1 | 12/2004 | Enlow et al. |
| 2004/0253421 A1 | 12/2004 | Truog et al. |
| 2004/0253422 A1 | 12/2004 | Truog et al. |
| 2004/0253423 A1 | 12/2004 | Truog et al. |
| 2005/0003129 A1 | 1/2005 | Truog et al. |
| 2005/0092420 A1 | 5/2005 | Kinne et al. |
| 2005/0175818 A1 | 8/2005 | Kawabata et al. |
| 2005/0196607 A1 | 9/2005 | Shih et al. |
| 2005/0255271 A1 | 11/2005 | Brimo |
| 2006/0003114 A1 | 1/2006 | Enlow et al. |
| 2006/0029765 A1 | 2/2006 | Truog et al. |
| 2006/0046027 A1 | 3/2006 | Kaminski et al. |
| 2006/0046028 A1 | 3/2006 | Kaminski et al. |
| 2006/0046083 A1 | 3/2006 | Steinhardt et al. |
| 2006/0051571 A1 | 3/2006 | Steinhardt et al. |
| 2006/0073318 A1 | 4/2006 | Tuttle et al. |
| 2006/0088695 A1 | 4/2006 | Coburn |
| 2006/0093776 A1 | 5/2006 | Crum |

FOREIGN PATENT DOCUMENTS

| | | |
|---|---|---|
| DE | 35 43 777 A1 | 6/1987 |
| DE | 197 35 958 A1 | 2/1999 |
| DE | 198 37 774 A1 | 2/2000 |
| EP | 0 032 258 A1 | 7/1981 |
| EP | 0 103 407 A1 | 6/1986 |
| EP | 0 216 230 A2 | 4/1987 |
| EP | 0 238 301 A1 | 9/1987 |
| EP | 0 103 344 B1 | 10/1988 |
| EP | 0 395 814 A2 | 11/1990 |
| EP | 0 233 633 B1 | 12/1991 |
| EP | 0 480 892 A1 | 4/1992 |
| EP | 0 266 224 B1 | 3/1993 |
| EP | 0 561 086 A1 | 9/1993 |
| EP | 0 569 921 A1 | 11/1993 |
| EP | 0 384 252 B1 | 8/1994 |
| EP | 0 623 477 A2 | 11/1994 |
| EP | 0 487 724 B1 | 9/1995 |
| EP | 0 695 629 A2 | 2/1996 |
| EP | 0 381 349 B1 | 7/1996 |
| EP | 0 473 254 B1 | 8/1996 |
| EP | 0 803 351 A1 | 10/1997 |
| EP | 0 619 184 B1 | 7/1998 |
| EP | 0 658 175 B1 | 10/1998 |
| EP | 0 893 247 A1 | 1/1999 |

| | | | |
|---|---|---|---|
| EP | 0 638 019 B1 | 1/2000 |
| EP | 1 018 533 A2 | 7/2000 |
| EP | 0 578 957 B1 | 8/2000 |
| EP | 1 038 665 A1 | 9/2000 |
| EP | 1 055 514 A2 | 11/2000 |
| EP | 1 055 514 A3 | 11/2000 |
| EP | 1 093 911 A2 | 4/2001 |
| EP | 1 053 793 B1 | 3/2002 |
| EP | 1 201 422 A2 | 5/2002 |
| EP | 1 203 968 A1 | 5/2002 |
| EP | 1 047 556 B1 | 7/2002 |
| EP | 1 226 958 A1 | 7/2002 |
| EP | 0 752 498 B1 | 6/2003 |
| EP | 1 169 180 B1 | 7/2003 |
| EP | 1 342 565 A1 | 9/2003 |
| EP | 1 023 169 B1 | 11/2003 |
| EP | 1 034 090 B1 | 12/2003 |
| EP | 0 993 876 B1 | 3/2004 |
| EP | 1 318 011 B1 | 9/2004 |
| EP | 1 462 423 A1 | 9/2004 |
| EP | 1 518 716 A1 | 3/2005 |
| EP | 1 377 646 B1 | 8/2005 |
| GB | 1 232 971 | 5/1971 |
| JP | 39-30394 | 10/1964 |
| JP | 49039997 A | 4/1974 |
| JP | 49-115003 | 11/1974 |
| JP | 50-004763 | 2/1975 |
| JP | 57-191568 | 11/1982 |
| JP | 63-72097 | 5/1988 |
| JP | 08/034959 A1 | 2/1996 |
| JP | 10/278187 A1 | 10/1998 |
| JP | 11-036549 | 2/1999 |
| JP | 2005-206724 A | 8/2005 |
| JP | 2005-220337 A | 8/2005 |
| WO | WO 88/07416 A1 | 10/1988 |
| WO | WO 90/00788 A1 | 1/1990 |
| WO | WO 92/13712 A1 | 8/1992 |
| WO | WO 94/03337 A2 | 2/1994 |
| WO | WO 94/09983 A1 | 5/1994 |
| WO | WO 95/17312 A1 | 6/1995 |
| WO | WO 99/19149 A1 | 4/1999 |
| WO | WO 99/37479 A1 | 7/1999 |
| WO | WO 99/64235 A1 | 12/1999 |
| WO | WO 00/01527 A1 | 1/2000 |
| WO | WO 00/50234 A1 | 8/2000 |
| WO | WO 00/56556 A1 | 9/2000 |
| WO | WO 01/00411 A1 | 1/2001 |
| WO | WO 01/79372 A2 | 10/2001 |
| WO | WO 03/053719 A2 | 7/2003 |
| WO | WO 03/066761 A2 | 8/2003 |
| WO | WO 03/095238 A1 | 11/2003 |
| WO | WO 04/062903 A2 | 7/2004 |
| WO | WO 04/074007 A2 | 9/2004 |
| WO | WO 04/074008 A2 | 9/2004 |
| WO | WO 05/007397 A1 | 1/2005 |
| WO | WO 05/075591 A1 | 8/2005 |
| WO | WO 05/105429 A1 | 11/2005 |

OTHER PUBLICATIONS

U.S. Appl. No. 60/778,832, filed Mar. 3, 2006, Steinhardt et al.
U.S. Appl. No. 60/779,191, filed Mar. 3, 2006, Westendorf et al.
U.S. Appl. No. 60/778,996, filed Mar. 3, 2006, Westendorf et al.
U.S. Appl. No. 11/413,543, filed Apr. 28, 2006, Westendorf et al.
U.S. Appl. No. 60/849,052, filed Oct. 3, 2006, Zeik et al.
U.S. Appl. No. 60/849,053, filed Oct. 3, 2006, Zeik et al.
Millikin & Company, "180 Walls", Jul. 18, 2006, Milliken & Company website www.180walls.com, home page, pages showing different patterns, and Frequently Asked Questions pages.
Fix-It Club, "How to Hang Wallpaper," http://home.howstuffworks.com, copyright 1998-2007, web pages printed Jan. 24, 2007, pp. 1-13, published on the internet by HowStuffWorks.com, c/o The Convex Group, Atlanta, GA, U.S.A.
Author Unknown, Avery Dennison™ "Find a Solution" Architectural film product information from website www.averydennison.com, copyright 1996-2007, web pages printed Feb. 6, 2007, Avery Dennison Corporation, Pasadena, CA U.S.A.
Author Unknown, Di-Noc™ Film Planning Guide, pp. 1-32, http://solutions.3m.com/wps/portal/3M/en_US/Graphics/Scotchprint/Solutions/Di-NocFilm/Bulletins/, date of publication unknown, Minnesota Mining and Manufacturing Company (3M), St. Paul, MN, U.S.A.
Author Unknown, Di-Noc™ Film Product Bulletin D1, pp. 1-5, http://solutions.3m.com/wps/portal/3M/en_US/Graphics/Scotchprint/Solutions/Di-NocFilm/Bulletins/, Aug. 2006, Minnesota Mining and Manufacturing Company (3M), St. Paul, MN, U.S.A.
Author Unknown, "Application of 3M™ Di-Noc™ Films, A Guide for Indoor and Outdoor Dry Applications, Instruction Bulletin 5.41", pp. 1-8, www.3m.com/intl/PH/downloads/Dinoc.pdf, Aug. 2006, Minnesota Mining and Manufacturing Company (3M), St. Paul, MN, U.S.A.
Author Unknown, "Instalacion de Di-Noc", pp. 1-27, http://www.pavimentosonline.com/3M/DINOC/index.htm, first date of publication unknown, downloaded Aug. 7, 2006, Minnesota Mining and Manufacturing Company (3M), St. Paul, MN, U.S.A.
Nopar International, "Folio Contact: We stick to your ideas!", "Products—FolioContact—FAQ", "Data Sheet Folio Contact Gridded/Squared, imprinted for permanent markers and white for non-permanent markers", NOPAR International GmbH website, www.jet-contact.com, downloaded Mar. 19, 2007, NOPAR International GmbH, Bremen, Germany.
Office Action for U.S. Appl. No. 10/324,559 mailed Dec. 19, 2008 (24 pages).
U.S. Appl. No. 10/324,559, filed Dec. 13, 2002, Office Action dated May 22, 2008 (14 pages).

* cited by examiner

ARTICLES AND METHODS FOR APPLYING COLOR ON SURFACES

CROSS REFERENCE TO RELATED APPLICATIONS

This application claims the benefit of U.S. Provisional Application No. 60/343,146, filed Dec. 20, 2001; U.S. Provisional Application No. 60/380,225, filed May 13, 2002; and U.S. Provisional Application No. 60/380,205, filed May 13, 2002.

FIELD OF THE INVENTION

The present invention is directed to articles and methods for applying color on a surface, for example an architectural surface, wherein a dry color component is employed and the use of wet tools such as brushes, sprayers and rollers, mess protection, color component cleaning materials and liquid volatile organic components for the color components may be avoided.

BACKGROUND OF THE INVENTION

It is often desirable to apply one or more colors to a surface, for example an architectural surface such as an interior or exterior wall or the like, for aesthetic benefits and/or functional benefits such as water resistance. Color is typically provided by conventional painting with water-based or oil-based wet paints, application of wallpaper or the like. The laborious processes involved with wet painting and wall papering are well known. Typically, it is necessary to protect surrounding areas from collateral mess during such activities by taping adjacent surfaces where the color is not desired, arranging drop clothes to protect floors and furniture, and the like. Extreme care must also be exercised to avoid dripping of paint, wallpaper paste or primer, or other wet-applied materials. Many wet paint and wall paper products are also recommended for use together with one or more primers or bases to assist in coverage and/or durability of the desired color, thereby increasing the time and labor for producing a desired color effect on such a surface. Additionally, it is typically necessary to saturate brushes, rollers or other applicators with paint, primer, paste or the like in order to apply the material to a surface. As a result, a significant amount of material is wasted, as it never reaches the intended surface, but remains on the applicator. Cleaning of brushes, sprayers, rollers and other tools used in application of wet paint and wall paper once painting or wall papering is completed, or at least suspended for a period of time, such as overnight, is also time consuming.

Many paints adapted for application to surfaces such as architectural surfaces include one or more volatile organic compounds. Such paints release noxious fumes during and after application, thereby requiring ventilation during and after application, particularly in closed environments such as buildings.

Thus, in spite of the obvious aesthetic and/or functional benefits provided by applying color on a surface by wet painting or wall papering, the efforts required in connection with such procedures are inconvenient and time consuming.

SUMMARY OF THE INVENTION

Accordingly, it is an object of the invention to provide articles and methods for applying color on a surface, for example an architectural surface, which overcome various disadvantages commonly associated with conventional wet painting and/or wall papering procedures.

In one aspect, the invention is directed to articles for applying color on a surface. In a first embodiment, the invention is directed to an article for applying color on a surface, which article comprises a sheet of dry color component and an adhesive on one surface of the sheet of dry color component, wherein the article is free of a releasable liner and is free of a carrier sheet. In another embodiment, the invention is directed to an article for applying color on a surface, which article comprises a sheet of dry color component and an adhesive on one surface of the sheet of dry color component, wherein the sheet and adhesive have a combined thickness of about 3 mils or less.

In another embodiment, the invention is directed to articles for applying color on a surface, which comprise (a) a sheet of dry color component including (i) a pigment, dye, or combination thereof in a polymeric binder, and (ii) a topcoat layer, (b) an adhesive on a surface of the sheet of dry colorant opposite the topcoat layer, and (c) a releasable liner. The sheet of dry color component is arranged between the releasable liner and the adhesive, and the releasable liner has a release agent on its surface adjacent the dry color component. The sheet of dry color component and the adhesive have a combined thickness of about 3 mils or less.

In a further embodiment, the invention is directed to an article for applying color on a surface, which article comprises a sheet of dry color component including a backing layer at one surface of the sheet of dry color component, and an adhesive on a surface of the sheet of dry color component adjacent the backing layer, wherein the sheet and adhesive have a combined thickness of about 3 mils or less.

In another aspect, the invention is directed to methods for providing a substantially permanent color effect on a surface, for example an architectural surface. In one embodiment, the methods comprise delivering an article according to one of the embodiments described above to an architectural surface. In another embodiment, the methods comprise applying an article comprising a dry color component to a surface, wherein, upon removal of any releasable liner, the applied portion of the article has a thickness of about 3 mils or less.

The articles and methods of the invention are advantageous in that color may be applied on a surface without requiring the use of wet tools such as brushes, sprayers and rollers for delivery of the articles or application of the dry color component, mess protection, or color component cleaning materials, and the dry color component is substantially free of volatile organic components. The articles and methods are further advantageous in that color may be applied on a surface in a less time-consuming manner as compared with typical wet painting and/or wall papering products and methods. These and additional objects and advantages will be more fully apparent in view of the following detailed description.

BRIEF DESCRIPTION OF THE DRAWING

The following detailed description will be more fully understood in view of the drawings in which.

The embodiments set forth in the drawing are illustrative in nature and are not intended to be limiting of the invention defined by the claims. Moreover, individual features of the drawing and the invention will be more fully apparent and understood in view of the detailed description.

DETAILED DESCRIPTION

The present invention is directed to articles and methods for applying color on a surface. As employed herein, the term "color" is used to refer to a color effect, i.e., a difference in color perception. In a specific embodiment, the color effect is a substantially permanent color effect, i.e., a color effect which is not removed or noticeably reduced upon casual contact, light washing, or the like. Thus, a substantially permanent color effect is distinguished from a temporary color effect which can be easily removed or reduced, such as that provided by chalk or crayons. The term "color component" is used herein to refer to the component of the inventive articles which provides the color effect. Exemplary color components will be described in further detail below.

The term "surface" is used herein to refer to any outer layer or boundary of an object or substrate which is capable of receiving a color component thereon. Suitable surfaces may be substantially two-dimensional and flat or substantially three-dimensional and including curves, angled portions or the like. In one embodiment, the surface to which color component is applied using the articles and methods of the invention comprises an architectural surface, i.e., a surface of a building, a building fixture (i.e., appliances), furniture, and the like. The architectural building surface may be an interior surface within the building or an exterior surface on an outer portion of the building. Substantially three-dimensional architectural surfaces can include, for example, edge treatments of two-dimensional surfaces such as moldings (e.g., moldings around windows or doorways), floorboards, appliances, furniture, and the like. The architectural surface may be permanently installed or may be temporarily installed or portable. The products of the present invention can further be applied to surfaces of articles to give them the same or different texture and/or appearance of architectural surfaces. For example, the products hereof can be used to apply a color layer to appliances, furniture, and other architectural articles. Additional surfaces suitable for application of color using the articles and methods of the present invention will be apparent to those skilled in the art in view of the present disclosure.

The term "wet" is used herein to refer to an article or process step which employs a liquid carrier. On the other hand, the term "dry" is used herein to refer to an article or process step substantially free of a liquid carrier such that immobilization of a color component is affected, i.e., the color component does not flow or move along the surface under ambient conditions. Thus, a dry color component is substantially free of a liquid carrier or vehicle, whereby the color component is physically immobilized in the article in which it is included. Similarly, reference herein to delivery of a dry color component without the use of liquid vehicles or carriers refers to the dry color component substantially free of liquid vehicle or carrier such that the color component is physically immobilized in the article in which it is included.

Thus, the dry color component employed in the articles of the present invention is substantially free of volatile organic components (VOC's) and water. According to standards of the Environmental Protection Agency, architectural coatings containing less than 250 g/l of volatile organic components are substantially free of such components. In selected embodiments of the present invention, the dry color component contains less than 250 g/l, more specifically about 200 g/l or less, more specifically about 100 g/l or less, and even more specifically about 50 g/l or less of volatile organic components. In further embodiments, the dry color component contains about 25 g/l or less volatile organic components, and more specifically about 20 g/l or less volatile organic components. In further embodiments, the dry color component similarly contains less than 250 g/l, more specifically about 200 g/l or less, and even more specifically about 100 g/l or less of water. In more specific embodiments, the dry color component contains about 50 g/l or less of water, and more specifically, about 25 g/l or less, more specifically about 20 g/l or less of water.

As will be discussed in further detail below, the articles and methods for applying color on a surface according to the present invention exhibit a number of advantageous properties. For example, the articles and methods of the invention are adapted for color application at room temperature and at relatively low application pressures, whereby the articles may be applied by ordinary consumers without the use of excessive pressure. Additionally, various surface effects can be provided.

The articles and methods may be employed to provide a porous surface covering which allows air to escape as the article is applied to a surface, thereby avoiding bubbles and/or wrinkles from appearing on a covered surface. In certain embodiments, the surface covering which is provided is microporous and therefore allows moisture to escape rather than accumulating between the applied article and a surface to which it is applied. For example, the surface coverings provided by the articles and methods according to the present invention may exhibit a water vapor transmission rate (WVTR) of greater than about 1 g-$\mu$m/cm$^2$/24 hrs, more specifically, greater than about 4 g-$\mu$m/cm$^2$/24 hrs, at 100% relative humidity and 40° C., as measured according to ASTM F1249-90. The desired WVTR may be provided through the use of materials which inherently allow water vapor transmission and/or by providing pores, perforations, orifices or the like in the articles, either on a micro or macro scale. These and additional advantageous properties provided by the articles and methods of the invention will be further described hereafter.

Figure 1:
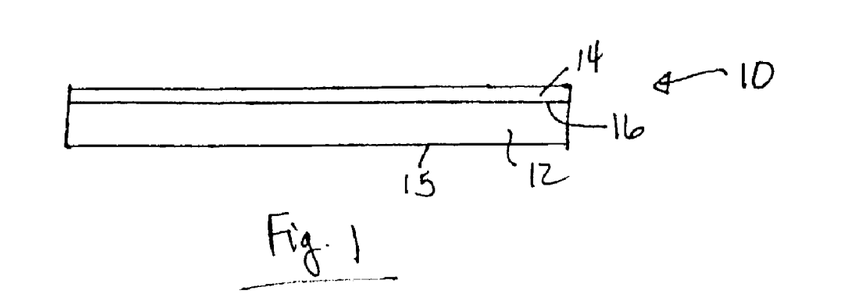
FIG. 1 sets forth a schematic diagram of one embodiment of an article for applying color on a surface according to the present invention.

FIG. 1 sets forth a schematic diagram of one embodiment of the articles according to the present invention. With reference to FIG. 1, the article 10 for applying color on a surface comprises a sheet 12 of dry color component and an adhesive 14 on one surface 16 of the sheet 12 of dry color component. The sheet 12 is shown as a single layer of dry color component. While the schematic diagram of FIG. 1 shows relative thicknesses of the sheet 12 and the adhesive 14, the illustrated thicknesses provide no representation or limitation of actual thicknesses of the respective components in the embodiment of FIG. 1 or in any of the embodiments of the remaining Figures. Additionally, while the interface between the components is shown as a clearly defined line, the actual interface between components may comprise other, different configurations.

As employed herein, the term "sheet of dry color component" is intended to refer to those portions of the inventive article which contribute to the color effect rendered to a surface, but does not include a releasable liner or other portions of the article which are not adapted for adherence, preferably substantially permanent adherence as described hereafter, to a surface to render the color effect. Thus, as will be described in further detail below, the sheet of dry color component may include not only a dry color component layer as shown in FIG. 1 but, in addition, one or more topcoat layers and/or one or more backing layers which contribute to the color effect.

Typically, the sheet of dry color component will have a thickness of less than about 0.003 inch (3 mils or 0.08 mm). In one embodiment, the sheet of dry color component will have a thickness of from about 0.0003 inch (0.3 mils) to about 0.003 inch (about 0.008 mm to about 0.08 mm), more specifically from about 0.0003 inch to about 0.0015 inch (about 0.008 mm to about 0.04 mm). In another embodiment, the sheet of dry color component will have a thickness about 0.0007 inch (0.02 mm) or less, and even more specifically not more than about 0.0005 inch (0.013 mm).

In embodiments wherein the article comprises the sheet of dry color component and adhesive, in the absence of layers such as liners or carriers, the thickness of the articles will be essentially that of the sheet of dry color component, as the adhesive layer is typically relatively thin, i.e., generally less than about 1 mil (0.001 inch or 0.03 mm) in thickness, more specifically about 0.5 mil (0.0005 inch or 0.013 mm) in thickness. Thus, in one embodiment, the sheet of dry color component and adhesive combined have a thickness of about 0.003 inch (3 mils or 0.08 mm) or less, more specifically from about 0.0003 inch to about 0.003 inch (about 0.008 mm to about 0.08 mm), even more specifically from about 0.0003 to about 0.0015 inch (about 0.008 mm to about 0.04 mm), and yet more specifically about 0.0007 inch (0.013 mm) or less. Advantageously, edges of adjacent sheets may thus be overlapped without significant overlap appearance. In further embodiments wherein one or more releasable liners are included, the thickness of the articles will be increased.

The dry color component is provided in at least one layer in the sheet of dry color component and may comprise any composition which provides opacity coverage to a surface to which it is applied. The dry color component may comprise, for example, pigment or dye, as well as combinations thereof; and a binder. Stains, inks, and paints are examples of compositions that may contain pigment and/or dye in combination with binder. Examples of dry color components include inks, stains, paints, and coatings similar to "wet" compositions, except for their being characterized by having low levels of solvent, liquid carrier, and other liquids as hereinbefore described. The binder can be a polymeric material that forms a coating, sheet, or film. A wide variety of binder materials are well known in the art and can be used in the present invention. Suitable binder materials are disclosed, for example, in the Enlow et al U.S. Pat. No. 6,336,998. Suitable binder materials can include the same polymeric materials described below for use as topcoats. Examples of binder materials also include polystyrene and polyacrylate/polyvinyl chloride blends. The sheet of dry color component can constitute a dry color component coating layer applied to another layer that is intended to remain on the surface to be colored, as described herein, or, alternatively, the sheet of dry color component may constitute a dry color component layer with sufficient integrity such that another layer is not required therein for substantially permanent application to the surface to be colored.

In one embodiment, the dry color component comprises a combination of (i) dry pigment and/or dye and (ii) binder, alone or in combination with additional components. For example, in specific embodiments, the dry color component comprises dry paint, which includes pigment in combination with additional conventional paint components, for example binder, from which a liquid carrier is removed, dry ink, which typically includes fine pigment or dyes, alone or in combination with additional conventional ink components, including opacifying agents, from which a liquid carrier is removed, dry stain, dry ink, or a combination of two or more of these components. The sheet of dry color component may comprise a single, solid homogenous color with a smooth finish or with a textured finish or may comprise regular or irregular patterns of two or more color components, and/or layers of color components. The sheet of dry color component may have a flat, eggshell, satin, semi-gloss, or gloss finish, as desired. The particular finish may be controlled by selection of color components and/or by selection of a releasable liner of suitable finish, if employed. Texture may be added either within the layer of dry color component, through a releasable liner, and/or through an adhesive layer, depending on the desired effect. The articles of the present invention are particularly advantageous for delivering a faux finish to a surface in a single application step. Faux finishes are well known in the art and generally provide a non-homogeneous decorative effect, examples of which include, but are not limited to, marbleizing, mottling, stippling, streaking, ragging and the like. In one embodiment, the dry color component is provided in a non-continuous or continuous, repeating or non-repeating pattern to provide a stencil-like effect on a surface.

The dry color component may exhibit gloss characteristics as desired. In one embodiment of the invention, the dry color component exhibits gloss characteristic of conventional architectural paints, such as flat, eggshell, satin, semi-gloss or gloss finishes, as desired. One of ordinary skill in the art will appreciate the difference between such finishes and high-gloss finishes such as are employed in, for example, the automotive industry. Gloss may be measured by specular reflectance of a beam of light at an angle of 60°. Typically, the specular reflectance for the sheet of dry color component of the present invention is less than about 60 gloss units at 60°. Specular reflectance may be measured using the test method described in GM Test Specification TM-204-A. The Byk-Mallinckrodt "multi-gloss" or "single gloss" gloss meters can be used for measuring specular gloss of the finished surface. Those gloss meters give values equivalent to those obtained from ASTM Method D-523-57. Either gloss meter is used with gloss standards covering the expected range of measurement, together with a piece of polished black glass plate of known refractive index. The gloss meter is calibrated by setting it to read the gloss of a highly polished standard and then reading the gloss of a working standard having a value preferably in the range of the test panel. The second standard should agree within one unit of its assigned value. At least two readings are taken on a different area of the test panel. These values are averaged if they agree within one unit. If the range is larger than one unit, additional regions are taken and a mean value is calculated. Desired gloss characteristics may be obtained by use of particles included in the dry color component sheet, a topcoat layer, post-treatment, texturization or the like in accordance with techniques known in the art.

Another benefit of low gloss surfaces is a reduced need for surface preparation prior to future applications of surface treatments that may be desired to change color and/or appearance, or prior to refinishing the surface with a fresh application of color treatment. In particular, high gloss surfaces, in general, tend to require roughness to be imparted to ensure good results when painting or applying other treatments to the surface.

In specific embodiments, the sheet of dry color component comprises two or more layers, at least one of which contains a color component to provide a desired color effect. Additional layers may comprise a topcoat, for example comprising a transparent, translucent, pearlescent or opaque coating, for example providing a gloss, semi-gloss, satin, eggshell, or flat sheen or other optical effects such as diffusion, reflectance or the like, or other beneficial properties, a white backing layer to provide intensity and/or consistency, an opacifying layer, or the like, and combinations thereof. Another benefit of such additional layers is that they can provide increased strength and/or flexibility to the sheet.

In a specific embodiment, the dry color component comprises a dry architectural surface color component, i.e., a color component particularly adapted for application to an architectural surface. Such dry color components typically exclude color components requiring not only conventional drying but an additional curing step, for example, a high temperature curing step, the addition of a reactive curing agent therein or the like. Thus, in one embodiment, the dry architectural surface color component is substantially free of cyanate curing agents, (meth)acrylate curing agents and cyanate-(meth)acrylate curing agents typically employed in curable enamel paints, whereby the color component contains any such curing agents therein in an amount which is less than that required to effect measurable crosslinking of the color component. In more specific embodiments, any such curing agents are contained in the color component in an amount less than about 0.0004% by weight.

As the dry color component is adapted to be applied to a surface in a dry state, the sheet of dry color component is produced at a manufacturing location. The sheet of dry colorant may be formed using latex compositions, water-dispersible compositions, solvent-based compositions, ultraviolet curable compositions, or the like. As the sheet is produced at a manufacturing location, paint drying or curing is affected within the manufacturing process and volatile organic components or other byproducts from the compositions may be captured in the manufacturing process. In one embodiment, these byproducts may be reclaimed or recycled as part of the manufacturing process.

The articles provide good opacity and coverage by application of a single sheet of dry color component, providing consumers with cost and time benefits. Preferably the articles exhibit an opacity index of at least about 0.95 as measured according to ASTM D2805. Typically, in such measurements, the article is carefully applied on a test surface, for example the surface of a color contrast card such as a Leneta opacity form 2A, avoiding bubbles and wrinkles. In more specific embodiments, the articles exhibit an opacity index of at least about 0.98, and more specifically at least about 0.995 as measured according to ASTM D2805. Substantially complete coverage, i.e., full hide, may be obtained even over dark surfaces, stained surfaces and the like. If desired, one or more layers or components of the article may include an additional opacifying agent, for example one or more metals, metal oxides, minerals, or the like, or a combination thereof, to improve the opacity of the article. Examples of such opacifying agents include, but are not limited to, titanium dioxide, carbon black, and the like. Suitable opacifying agents may be provided as clusters, powders, flakes, particles, or groupings of particles such as aggregates or agglomerates, or the like. Flakes having a minimum dimension of at least 0.02 microns and an aspect ratio of about 100 to 1000 are desirable. Particles, for example, titanium dioxide particles, that impart good opacification preferably have a dimension in the range of about 0.15 to 150 microns and more preferably from about 0.20 to 50 microns. While the opacifying agent may be provided in the sheet of dry color component, in alternative embodiments, the opacifying agent, if employed, may be included in the adhesive or a backing layer, or in one or more other layers as desired. While not wishing to be bound by theory, it is believed that many household stains, particularly oil-based stains, exhibit reduced surface energy and tend to repel wet paint, particularly water-based wet paints, thereby making stains difficult to cover and often requiring additional pretreatment steps. Wet water-based paints can also cause flash rusting when water migrates from the paint to nail heads and the like. However, the dry color component sheets of the present invention are substantially free of a liquid carrier, whereby the aforementioned problems associated with liquid carriers are avoided. Advantageously, stains can often be covered without pretreatment of the stained surface.

The dry color component advantageously exhibits a minimum level of elasticity sufficient to allow bending, rolling, or similar manipulations of the sheets without causing cracking, breaking or other damage to continuous areas of dry color component.

In one embodiment, the articles of the invention also exhibit less than 50% elongation when measured according to ASTM D882 using a 1.0 inch (2.54 cm) wide sample and a 2.0 inch gauge length at a crosshead speed of 20 in/min (50.8 cm/min). Generally, elongation is measured at room temperature which, as used herein, refers to temperatures less than about 100° F. (38° C.). Typically, the elongation as described above is exhibited at temperatures of from abut 40° F. (4° C.) to about 95° F. (35° C.), more specifically at about 60° F. (15° C.) to about 80° F. (27° C.). In further embodiments, the articles exhibit 25% or less elongation, according to ASTM D882 as described.

The sheet of dry color component may also exhibit sufficient conformability to adapt to the form of the surface to be colored. In addition, the sheet of dry color component may be sufficiently conformable to allow the articles to be easily manipulated around and/or into corners and other three-dimensional configurations. Further, the sheet of the dry color component may be microconformable. As used herein, microconformability refers to the ability of the articles to become similar in form or character to the surface to which they are adhered, whereby, upon application, the sheet of dry color component will closely mimic the texture of the underlying surface to provide a paint-like appearance. The conformability and microconformability are preferably exhibited at room temperature as defined above.

In the embodiment shown in FIG. 1, the article 10 for applying color on a surface is free of a releasable liner and is free of a carrier sheet. As used herein, the term "releasable liner" is generally used to refer to a sheet which is removable and is intended and adapted for removal shortly before or upon application of the sheet of dry color component to the desired surface. On the other hand, as used herein, carrier sheet is used to refer to a sheet which is intended and adapted for application to a surface, typically between the surface and a layer providing a decorative effect, to provide structural support. A common carrier comprises, for example, a wallpaper backing sheet. Carrier layers are typically significantly greater than 3 mils (0.08 mm) in thickness and therefore are significantly distinguishable from the sheet of dry color component and the articles of the present invention. Thus, in the embodiment of FIG. 1, neither a carrier sheet nor a releasable liner is employed. In a further embodiment, the article is free of cellulosic materials, particularly cellulosic substrates commonly employed in wallpaper carrier layers. In a more specific embodiment, the article 10 consists essentially of the sheet 12 of dry color component and the adhesive 14 on the surface 16 of the sheet 12 and does not include any other component which would materially affect the use or properties of the article.

In another embodiment, the sheet 12 of dry color component comprises a reinforcing component. The reinforcing component may be used to provide strength or structural integrity to the sheet material and/or to provide the sheet material with increased thickness or body to facilitate handling and/or use of the article. Other advantages resulting from the use of a reinforcing component will be apparent in view of the present disclosure. The reinforcing component may comprise any additive which achieves one or more of the intended reinforcing benefits. Preferably, the reinforcing component does not disadvantageously alter the rheology of the sheet of dry color component, whereby the sheet exhibits sufficient elasticity to allow bending, rolling and the like without causing cracking or other damage to the dry color component sheet. Examples of suitable reinforcing components include, but are not limited to, filaments, fibers, films, nonwovens, scrim, threads, sheets and the like, or a combination thereof, and may be formed of any suitable material, including polymers, metals, cellulosic materials, glass, ceramics, and the like. The reinforcing component is distinguishable from a carrier sheet or layer as the reinforcing component is provided within the sheet of dry colorant and is not adapted or intended for arrangement between the sheet of dry colorant and a wall surface. In contrast, a carrier sheet, as noted above, is intended and adapted for application to a surface between the surface and a layer providing a color effect, such as in wall paper.

Figure 1A:
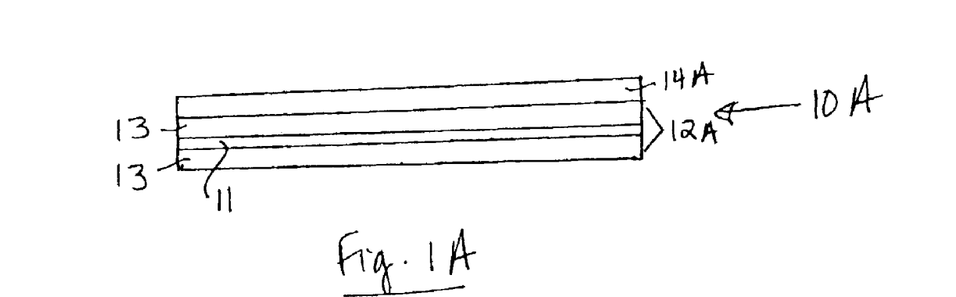
FIG. 1A sets forth a schematic diagram of an article as set forth in FIG. 1, including a reinforcing component.

The reinforcing component may be provided in the sheet 12 in a patterned manner, for example, as a thinly woven structure, or in a non-patterned, non-woven manner, using any desirable technique, for example casting, mixing, coating or spraying. In one embodiment, the reinforcing component will be of a sufficiently small dimension so as to not provide an undesirable irregular surface when the sheet of dry color component is applied to the surface for which a color benefit is desired. For example, in such embodiments, suitable reinforcing components should have a thickness dimension not greater than about 75% of the thickness of the sheet of dry color component. In alternate embodiments, the reinforcing component may be of sufficient thickness to provide surface texturing of the sheet of dry color component. FIG. 1A shows an article 10A comprising a sheet 12A of dry color component and an adhesive 14A. The sheet 12A comprises a reinforcing component 11 and layers 13 of dry color component.

Adhesive, as used herein, refers to a substance which is adapted to adhere the article of the invention to a surface at room temperature which, as used herein, generally refers to temperatures less than about 100° F. (38° C.). Typically, for use on architectural surfaces, the adhesive will exhibit the required adhering effect at temperatures in a range of from about 40° F. (4° C.) to about 95° F. (35° C.). Additionally, the adhesive exhibits its adhering effect at low application pressures, thereby allowing application and adherence of the articles of the invention to a surface to be colored by hand or with simple tools. In one embodiment, the adhesive is adapted to adhere the article to a surface to be colored by application of a pressure of less than about 50 lb/in$^2$ (3.5 kg/m$^2$) more specifically less than about 30 lb/in$^2$ (2.1 kg/m$^2$), and even more specifically less than about 20 lb/in$^2$ (1.4 kg/m$^2$). In a further embodiment, the adhesive is adapted to adhere the article to a surface to be colored by application of a pressure of from about 3 lb/in$^2$ (0.21 kg/m$^2$) to about 10 lb/in$^2$ (0.7 kg/m$^2$).

In FIG. 1, the adhesive 14 is illustrated as a layer on the surface 16 of the sheet 12. The adhesive may be provided in layer form as illustrated, or may be provided in any continuous or non-continuous configuration as desired. The adhesive serves to adhere the sheet of dry color component to the surface to be colored. Preferably, the adhesive is of a character and is provided in an amount to allow repositioning of the article when the article is initially applied to a surface, such that the sheet of dry color component may be temporarily adhered to a surface to be colored and, if improperly positioned, may be repositioned or even removed from the surface and reapplied for proper positioning, and such that once proper positioning of the sheet of dry color component has been obtained, the sheet of dry color component may be permanently adhered to the surface. Thus, in one embodiment, the adhesive is adapted to exhibit an initial tack in response to a first condition and a subsequent tack greater than the initial tack in response to a second condition.

An initial low tack suitable to allow repositioning is about 100 grams/inch or less, more preferably in the range of from about 25 grams/inch to about 50 grams/inch, as measured in a 180° angle peel test using a 1.0 inch wide peel strip according to ASTM D3330 and/or PSTC-1. The subsequent tack is greater than the initial tack and in a specific embodiment provides a substantially permanent adhesion or bond between the sheet of dry color component and the surface.

In one embodiment, the first condition may comprise a first application pressure which causes the adhesive to exhibit the initial tack, while the second condition may comprise a second, greater application pressure which causes the adhesive to exhibit a second greater tack. In an alternate embodiment, the first condition may comprise a first period of time after application of the article to a surface, during which period of time the adhesive exhibits a level of tack allowing repositioning, and the second condition is the period of time occurring after expiration of the first period of time, i.e., a "second period of time". After the first period of time, the adhesive exhibits a level of tack that inhibits or prevents repositioning. The period of time during which the tack increases from a repositionable level to the substantially permanent level is a matter of choice that can be designed into the product by selection of adhesive, in accordance with ordinary skill in the adhesive art. In certain embodiments, the first time period will be from about 2 hours to about 24 hours. Thus, in this embodiment, the adhesive may be provided such that the article is positioned on and adhered to a surface using a single pressure, applied by hand or with a simple applicator tool, and the permanence of the adhesive tack increases over time once the article has been applied on a surface.

The adhesive component of the articles of the invention is a dry adhesive, i.e., an adhesive which is substantially free of a liquid carrier such that it is immobilized on the sheet of dry color component and does not drip therefrom. Exemplary, but non-limiting adhesives include hot melt-, pressure sensitive-, water based-, water borne-, solvent based-, ultraviolet- and e-beam cured adhesives, and combinations thereof. In one embodiment, the adhesive comprises a pressure sensitive adhesive, for example, hot melt pressure sensitive adhesive, or water-based or -borne pressure sensitive adhesive, for example a liquid emulsion pressure sensitive adhesive, which may be applied to a sheet of color component and then dried to provide the articles of the present invention. Alternatively, the adhesive may be a static adhesive, for example an electrostatic adhesive. It is preferred that the adhesive cause the sheet of dry paint and the substrate to have a final bond strength of greater than about 100 grams/in, more specifically greater than about 150 grams/in, and even more specifically greater than about 200 grams/in, as measured according to ASTM D3330 as described above using a 1 inch wide peel strip.

While the adhesive may allow initial repositioning of the sheet of dry color component, the adhesive preferably provides an at least substantially permanent bond between the dry color component and the surface to which the color effect is provided upon completion of the application process and curing of the adhesive. A substantially permanent bond is one that is not broken upon casual contact, light washing or the like. The at least substantially permanent bond may be provided by removable adhesion, whereby the dry color component may be removed from the surface without destruction of the sheet of dry color component. Alternatively, the substantially permanent bond may be provided by latent permanent adhesion, whereby the sheet of dry color component may not be removed without destruction of the sheet.

In one embodiment, the adhesive is a pressure activated adhesive wherein the adhesive tack is lower at low application pressures, thereby allowing initial repositioning of the sheet of dry color component on a surface without damaging the sheet of dry color component, but upon application of higher pressure, the adhesive exhibits greater tack whereby a more permanent bond is formed between the sheet of dry color component and the surface to which it is applied, whereby the sheet of dry color component is substantially permanently attached to the surface, i.e., the sheet does not spontaneously separate and is not removed upon casual contact, light washing or the like. Various pressure sensitive adhesives are known in the art and may be used in the articles of the present invention. Such pressure sensitive adhesives may be provided at a low coating weight or in a patterned or textured manner in order to allow repositioning while providing latent permanent adhesion.

Examples of pressure sensitive adhesives include adhesives containing microspheres, employed in one, two or more layers. Such microspheres can be, for example, breakable or deformable upon application of force to the adhesive or article. Compositions containing breakable or deformable microspheres are described, for example, in the Erwin U.S. Pat. No. 3,314,838 and the Danielson et al U.S. Pat. No. 3,331,729. Adhesives containing microspheres are commercially available, one example of which is available under the tradename Controltac® from 3M Company. Pressure sensitive adhesives are alsodisclosed, for example, in the Questel et al U.S. Pat. No. 6,020,062. Additional formulations for pressure-sensitive adhesive compositions are disclosed in the Blackwell U.S. Pat. No. 5,073,457 and the Sagoff et al U.S. Pat. No. 4,151,319, which adhesives provide repositioning and latent permanent adhesion, and the Reaves et al U.S. Pat. No. 5,939,479, disclosing an adhesive which provides repositioning adhesion. Additional pressure-sensitive adhesives are commercially available and include Fasson® 2001, a latent permanent adhesion product commercially available from Avery Dennison.

The tack of the adhesive may also be varied as described above by application of a blocking agent on the exposed surface of the adhesive. The blocking agent has the affect of lowering the initial tack of the adhesive at the exposed surface of the adhesive. Thus, the blocking agent as defined herein lowers the low pressure tack of an adhesive while permitting high tack to be achieved with the application of higher pressure which displaces the blocking agent. Suitable blocking agents can be solid structures that cover at least a portion of the surface and extend over the outer surface of the adhesive. The blocking agents may form a plurality of discrete structures or may form an interconnected network. One of ordinary skill in the art will recognize various suitable blocking agents for use in such an embodiment.

In one embodiment, the blocking agent may comprise compositions containing repositionable microspheres. Such compositions may be provided in one or more layers as described in the Parrotta U.S. Pat. No. 4,376,151. Examples of additional blocking agents include, but are not limited to, those disclosed in the Ochi U.S. Pat. No. 4,556,595, clusters, powders or particles of, for example, starch, including but not limited to potato starch or corn starch, talc, silicon dioxide, titanium dioxide, zeolite, or other minerals, polymers or polymer prills, glass or ceramic beads, or the like. The amount and size of such materials will depend on the type and tack of individual adhesives. In one example, talc particles having an average particle size of about 0.1 mm are applied in an amount of about 2 to about 6 $g/m^2$ to sufficiently reduce initial tack to allow repositioning without a proportionate decrease in final tack. In another example, silicon dioxide particles having an average particle size of about 25 nm are applied in an amount of from about 1 to about 3 $g/m^2$. In yet another example, titanium dioxide particles having an average particle size of about 50 nm and are applied in an amount of from about 1 to about 3 $g/m^2$. The blocking agent may be applied in a uniform or nonuniform pattern as desired.

In one embodiment of the articles of the invention, the sheet of dry colorant is permanently adhered to the surface such that it may not be removed without damaging the sheet of dry color component. In a further embodiment of the articles of the invention, the sheet of dry colorant is permanently adhered to the surface such that it cannot be removed by casual contact, washing or the like, but it may be removed without substantial destruction of the sheet.

In one embodiment, the sheet 12 of dry color component may further include a release agent coating at its outer surface 15, i.e., on the surface of the sheet 12 which is opposite, i.e., not adjacent, the adhesive 14 as shown in FIG. 1. Suitable release agents are discussed in detail below. Alternatively, or in addition, the sheet 12 of dry color component may include a top or outer, exposed film or coating at its surface, hereinafter a "topcoat." The topcoat may comprise a transparent, translucent, pearlescent, opaque or other formulation as necessary to provide a desired optical effect, and/or to provide the sheet of dry color component with increased protection, stiffness and/or structural support. For example, the topcoat may be employed to provide a desired sheen to the dry color component, i.e., flat, satin, eggshell, semi-gloss or gloss, to increase the opacity, diffusion or reflectance of the dry color component upon application to a surface, or the like. In further embodiments, the topcoat may include one or more additional components which provide the sheet of dry color component with improved durability, chip resistance, washability, stain repellence, fade resistance, including ultraviolet light fade resistance, fluorescence, phosphorescence, bactericidal properties, fragrance, odor removal, non-permanent writability (allowing erasure or washing to remove), noise and/or heat insulation, conductivity, static dissipation, and/or environmental interaction, for example allowing shade or color change based on temperature or the like.

Figure 1B:
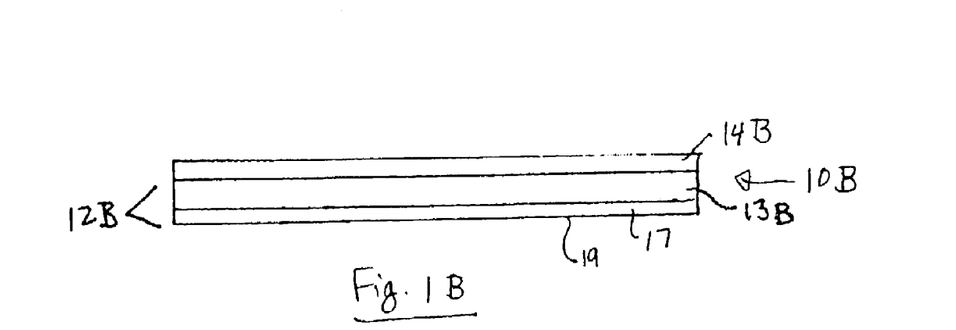
FIG. 1B sets forth a schematic diagram of an article as set forth in FIG. 1, wherein the sheet of dry color component includes an additional protective film layer.

The topcoat is provided at the outer surface of the sheet 12 and may be permanently or temporarily adhered to the underlying layer. FIG. 1B shows an article 10B comprising a sheet 12B of dry color component and an adhesive 14B. The sheet 12B includes a layer 13B of dry color component and a topcoat 17. The topcoat 17 may similarly be provided with a release agent coating at its outer surface 19. The topcoat may be formed of any suitable material, examples of which include polymers, for example polyurethanes, polyvinyl chlorides, polyvinylidine fluorides, polyacrylates, cellulosic materials and the like, as well as blends thereof, and optionally various particles for altering optical effects or texture of the surface of the dry color component sheet. Specific examples of topcoats include polyurethane and blends of polyacrylate and polyvinylidine chloride. The topcoat can be transparent. In other embodiments, the topcoat can be translucent, or at least partially opaque. Other topcoat materials suitable for use herein will be apparent to those of ordinary skill in the art.

In one embodiment, the topcoat is configured, either microscopically or macroscopically, to allow the sheet of dry color component and adhesive to provide a surface covering with a desired WVTR, for example greater than 1 g-μm/cm²/24 hrs, at 100% relative humidity and 40° C., as measured according to ASTM F1249-90. The topcoat may, for example, be provided with perforations, pores, orifices or the like, or may be formed of a material exhibiting such WVTR. In one embodiment, the topcoat is formed of a polymeric coating such as, but not limited to, polyurethane coating, having a sufficiently small thickness, for example, of about 0.5 mils (0.013 mm) or less, and in a further embodiment, of about 0.25 mils (0.007 mm) or less, to allow the desired WVTR.

Figure 2:
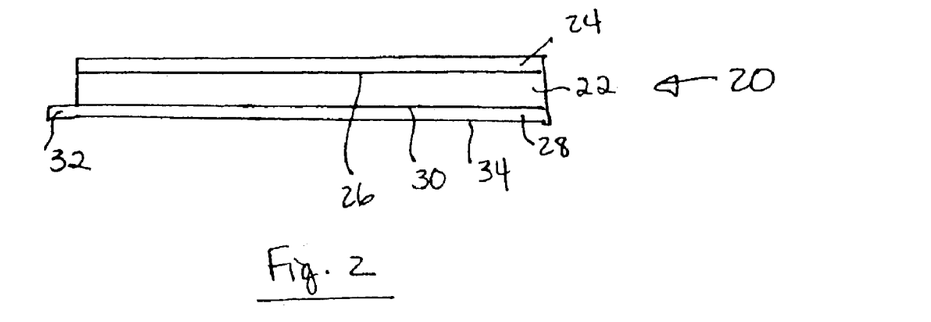
FIG. 2 sets forth a schematic diagram of another embodiment of an article for applying color on a surface according to the present invention.

FIG. 2 sets forth a schematic diagram of another embodiment of an article for applying color on a surface according to the invention. The article 20 includes a sheet 22 of dry color component, an adhesive 24 on the surface 26 of the sheet of dry color component and a releasable liner 28. The sheet 22 of dry color component is arranged between the releasable liner 28 and the adhesive 24. The releasable liner 28 may be included in order to provide structural support and/or strength to the sheet 22 of dry color component, for example when the releasable liner is in film form, and/or to facilitate handling of the article during manufacture, storage and use. The releasable liner is adapted for removal from the sheet of dry color component prior to or upon application of the sheet of dry color component to a surface to be colored. Typically, the releasable liner will be removed from the sheet of dry paint by peeling therefrom. As shown in FIG. 2, the releasable liner may be provided with a tab 32 which extends beyond the sheet of dry color component to assist peeling of the liner 28 from the sheet 22 of dry color component. Alternatively, the release liner may be removed using an adhesive tape that may be applied to the corner (or other edge) of the release liner and then pulled off, for example, after the sheet of dry colorant has been applied to a surface. The adhesive tape pulls the release liner off the sheet of dry colorant, leaving the sheet of dry colorant attached to the surface. The adhesive tape does not damage the surface of the sheet of dry colorant or adjacent sheets of dry colorant. An example of a suitable adhesive tape is Temp RL™ tape commercially available from Saint Gobain. In a further embodiment, the articles may be adapted for use with a simple separator tool which facilitates separation of the releasable liner from the sheet of dry colorant. Such a tool may be provided with at least one straight edge which acts to separate the releasable liner at an edge of the article.

In one embodiment, the articles of the invention include a releasable liner adjacent the sheet of dry color component and, in the planar configuration of the articles as shown in FIG. 2, are free of a releasable liner on the adhesive. Thus, in the embodiment of FIG. 2, the upper surface of the adhesive 24 is free of a releasable liner when the article is in a planar, nonrolled configuration. When an article as shown in FIG. 2 is in a roll form, the releasable liner 28 will be positioned adjacent, and possibly contacting, the exposed adhesive 24 and therefore may provide a release surface to allow unrolling of the article without interference of the adhesive, as is described in greater detail below.

In further embodiments, the articles may comprise two or more releasable liners. For example, the article 20A of FIG. 2A comprises a sheet 22A of dry color component, including layer 23 of dry color component and topcoat layer 27, and an adhesive 24A, in combination with a releasable liner 28A on the surface of the sheet 22A of dry color component which is opposite that of the adhesive 24A, and a releasable liner 36 on the adhesive 24A. The topcoat layer 27 on the sheet 22A of dry color component may provide the color component with additional properties as discussed above, between the sheet 22A and the releasable liner 28A.

The releasable liner may be formed of any material which provides the desired structural support or strength to the sheet of dry color component to facilitate manufacture, handling and/or application of the article to a desired surface. Typically, the releasable liner will have a combination of basis weight, thickness and rigidity to provide the desired structural support and/or strength to the article. For example, the releasable liner may be formed of a polymer material, for example as a thin polymeric film, as a woven sheet, or as a non-woven sheet, or of a fibrous ligno-cellulosic material such as paper. In one embodiment, the releasable liner comprises a polymer film. Conveniently, the sheet of dry color component may be formed on the polymer film, for example by coating or printing the color component directly on the polymer film surface. The release surface may be relatively flat and smooth but may also be textured or three dimensionally configured via embossing, microembossing, thermoforming with heat and pressure, vacuum forming, or other approaches known to those skilled in the art.

In one embodiment, the releasable liner is formed of a material which is inherently releasable from the sheet of dry color component. Suitable materials which may be used to form an inherently releasable liner include, but are not limited to, silicone-based polymers, including copolymers thereof, fluorocarbon polymers, including copolymers thereof, fluoro-acrylate polymers, including copolymers thereof, and polymers, including copolymers, which include a release additive, for example a silicone or fluorocarbon additive, therein. Examples of polymers containing such additives include polyolefins, for example, polyethylene homopolymers and copolymers, polypropylene homopolymers and copolymers and polymethyl pentene homopolymers and copolymers, polystyrene homopolymers and copolymers, polyester homopolymers and copolymers, for example polyethylene terephthalates (PET), and polyamide homopolymers and copolymers, including one or more release additives such as silicone oils, silicone surfactants, silicone homopolymers and copolymers, fluorocarbon oils, fluorocarbon surfactants, fluorocarbon homopolymers and copolymers, for example fluoro-acrylate homopolymers and copolymers, and mixtures thereof. Suitable release additives may alone be liquid or solid at room temperature. Suitable release additives may be liquid or solid at room temperature. U.S. Pat. Nos. 5,476,901 and 5,641,835, each of which is incorporated herein by reference, disclose examples of suitable silicone-polyolefin copolymers suitable for use in forming a releasable liner in the articles of the present invention. U.S. Pat. No. 5,728,469, incorporated herein by reference, discloses additional suitable block copolymer release materials for pressure sensitive adhesives. European Patent Application EP 1 018

533 A2, incorporated herein by reference, further discloses silicone-containing resin suitable for use as a release layer.

Alternatively, or in addition, a release agent may be provided between the releasable liner and the sheet of dry color component in order to assist removal of the releasable liner from the sheet of dry color component. For example, in the article of FIG. 2, the release agent is provided at interface 30 between the sheet 22 of dry color component and the releasable liner 28. The release agent may be provided as a coating or as a separate film layer in the article. In a specific embodiment, the release agent is provided as a coating on one or both of the interface surfaces between the sheet of dry color component and the releasable liner. Various release agents are known in the art and are suitable for use herein and include, but are not limited to, silicone oil, silicone surfactant, silicone homopolymer or copolymer, fluorocarbon oil, fluorocarbon surfactant, fluorocarbon homopolymer or copolymer, for example fluoro-acrylate homopolymers and copolymers, and mixtures thereof. The release agent may be provided as a coating on the surface of the dry sheet of color component at the interface 30 adjacent the releasable liner, as a coating on the releasable liner surface of at the interface 30 adjacent sheet of dry color component, as a layer between the sheet of dry color component and the releasable liner, or any combination thereof. Such coatings may be continuous or non-continuous as is necessary in order for the liner to be releasable from the sheet of dry color component without damage to the surface of the sheet of dry color component. In one embodiment, the release agent comprises a polymeric material, for example a polysilicone, which is applied as a continuous or non-continuous coating on the surface of the releasable liner 28 at the interface 30.

In one embodiment, the releasable liner may further include a release agent at its outer surface 34, i.e., on the surface of the liner which is opposite, i.e., not adjacent, the sheet of dry color component. In the embodiment of the article of FIG. 2 wherein the releasable liner 28 is provided with a release agent on the surface 34 which is opposite to the sheet of dry color component, the release agent on surface 34 prevents the surface 34 from adhering to the adhesive 24 during storage, handling and use of the article. For example, the provision of a release agent on surface 34 facilitates storage of the article in a rolled manner. Similarly, in the embodiment of FIG. 1, the surface 15 of the sheet 12 of dry color component may be provided with a release agent to prevent adhesion of the surface 15 with adhesive 14 during storage, handling and use of the article 10. Release agents of the type discussed above are suitable for application to surface 15 or surface 34.

In the embodiment of FIG. 2, the adhesive 14 may include a blocking agent of the type discussed above, wherein the blocking agent renders the adhesive pressure activatable, whereby the adhesive tack is reduced at low application pressures to allow initial repositioning of the article on a surface to be colored, while upon application of higher pressure, the adhesive permanently bonds the sheet of dry color component to the surface.

In an alternate embodiment, the releasable liner 28 is arranged on the surface of the sheet 22 of dry color component at interface 30 without any additional layer, coating or component therebetween. In this embodiment, the releasable liner 28 is preferably formed of a material which inherently releases from the surface of the sheet 22 of dry color component at the interface 30. This embodiment eliminates any residue of release agent on the surface of the sheet 22 of dry color component once the releasable liner 28 is removed therefrom.

Figure 3:
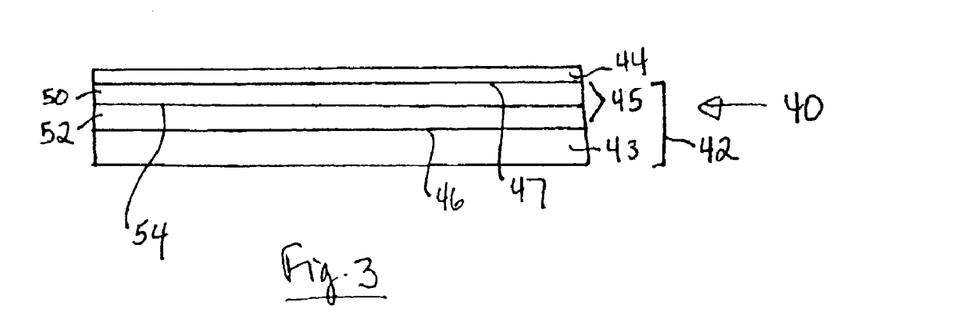
FIG. 3 sets forth a schematic diagram of another embodiment of an article for applying color on a surface according to the present invention.

FIG. 3 sets forth a schematic diagram of yet another embodiment of an article for applying color on a surface according to the invention. The article 40 includes a sheet 42 of dry color component, including a layer 43 of dry color component and a backing layer 45 on one surface 46 of the layer 43 of dry color component. An adhesive 44 is provided on the surface 47 of the backing layer 45. The article comprising the sheet 42 and the adhesive 44 has a thickness of about 3 mils (0.08 mm) or less, more specifically about 2 mils (0.05 mm) or less, and even more specifically about 1 mil (0.3 mm) or less. Thus, the article of this embodiment is significantly thinner than conventional wallpaper products which typically have significantly thicker carrier substrates. The backing layer 45 may be included, for example, in order to provide structural support and/or strength to the sheet 42 of dry color component, to provide additional opacifying, whitening or color strengthening effects, and/or to facilitate handling of the article during storage and use. The backing layer may be formed of any suitable thin material, examples of which include, but are not limited to, paper and other cellulosic materials, polymer films and woven or nonwoven fabrics, textile fabrics, glass or ceramic fabrics, metallized layer (s), and the like. In one embodiment, the backing layer may provide increased opacity to the article upon application to a surface to be colored. For example, the backing layer may include titanium dioxide, metal filler or the like to provide increased opacity. Preferably, the backing layer will exhibit sufficient flexibility to allow bending, rolling and other similar manipulations of the article.

In one embodiment, the backing layer comprises a metallized film, i.e., a laminate of two or more polymer films having a metallized layer or coating between two internal surfaces thereof. As shown in FIG. 3, the backing layer 45 may comprise a laminate of two polymer films 50, 52, for example formed of polyethylene terephthalate, having a metallized coating 54, for example formed of silver ink, a metal oxide, aluminum, stainless steel or the like, therebetween. One example of an aluminum ink is Metalure®, commercially available from Eckart America Division (Painesville, Ohio, USA) of Eckart Werke GmbH and Company (manufactured by Avery Dennison Corp.). The metallized coating may be continuous or discontinuous, and patterned or non-patterned as desired. Preferably, polymer film 52 is very thin and may comprise a tie layer or coating to the sheet of dry color component. The polymer film 50 may provide a surface for the metallized coating 54 and may provide structural support to the article. In one embodiment, the sheet 42 of dry color component may further include a release agent coating at its outer surface, i.e., on the surface of the sheet 42 which is opposite, i.e., not adjacent to, the surface including the backing layer 45. In yet another embodiment, one of the layers of polymer film 50 or 52 may be eliminated providing an article that is even thinner, yet remains opaque.

The size of the articles according to the present invention by width and length may vary in accordance with the dimensions of surfaces to be colored. For example, the articles may be provided in relatively large lengths suitable for coloring an entire length or multiple lengths of an interior architectural surface. Sheets of such lengths may be stored in roll form. Alternatively, the articles may be provided in smaller sheets, for example in tile size to accommodate small areas. Similarly, articles may be provided in strip or smaller sized form for use in areas of smaller dimensions, for example, as trim around moldings, borders, accent pieces (e.g., stencils), outlets, corners and areas adjacent to surfaces which are not intended for color application. Smaller sized articles may also be convenient for repairing damaged areas.

The articles according to the present invention allow one to apply color on a surface by delivering dry color component to the surface. More specifically, the articles allow one to provide a substantially permanent color effect on a surface. Advantageously, the dry color component is delivered to the surface without the use of wet tools for delivering the color component, for example without the use of wet paint applicators, such as paint brushes, paint sprayers or paint rollers, or paint trays, without the use of mess protection such as taping or drop cloths, without the use of color component cleaning materials commonly required for washing paint applicators, and/or without the use of liquid volatile organic component vehicles such as oil-based solvents for the color component. As a result, a color effect may be obtained more quickly and easily, while avoiding many problems associated with wet application as discussed herein.

Thus, in one embodiment of the present methods, an article comprising a dry color component is applied to an architectural surface. After application and upon removal of any releasable liners included in the article, the remaining portion of the article, for example the dry color component and any adhering means, i.e., adhesive, has a thickness of about 3 mils or less.

In a preferred embodiment of the present methods, the dry color component is delivered to the surface in the form of a sheet of dry color component as discussed above. Preferably, the sheet of dry color component has an adhesive on one surface thereof. The methods according to the invention may further comprise the step of initially adhering the delivered dry color component to the surface, for example by exerting light pressure on the sheet of dry color component to temporarily bond the sheet of dry color component to the surface to be colored, optionally adjusting the position or alignment of the sheet, and exerting increased pressure on the sheet of dry color component to permanently bond the sheet of dry color component to the surface to be colored. For example, when the sheet of dry color component is provided in an article 10 as described in FIG. 1, pressure may be applied to surface 15 of the article to adhere the adhesive 14 to a surface to be colored. In the article 20 of FIG. 2, pressure is applied to surface 34 as adhesive 24 contacts the surface to be colored in order to adhere the article 20 including the sheet 22 of dry color component to a surface to be colored.

The articles of the invention may be applied to a surface merely by hand placement or with the use of a simple applicator, for example a wall paper roller, and/or dispenser, or other tool. Similarly, any pressure required for adhesion of the articles may be applied by hand or with a tool. Such pressure may be applied in a single pass or by two or more passes over the article.

The articles and methods according to the invention provide improved means for providing color to a surface, for example an architectural surface such as an interior wall, and avoid many of the disadvantages associated with conventional wet painting and wall papering. The risk of paint spills and splatters and the risk of painting undesirable surfaces is eliminated as the dry color component such as paint is immobilized or contained prior to and during application. Thus, taping, drop cloths and other protective measures commonly employed for floors, furniture and adjacent areas are not required. Additionally, the articles and methods allow the coloring to be achieved in increments of time and do not require a continuous large block of time to perform. Similarly, application may be interrupted without inconvenience. Further, since the color component is immobilized or contained in the articles according to the invention, the overall amount of color component needed to achieve a desired result is reduced as compared with conventional wet painting wherein various collateral surfaces of applicators, protective tapes, drop cloths and the like receive excess paint. Moreover, since the articles may be repositioned prior to permanent bonding, precise location is allowed, and, since the articles are substantially free of liquid carriers, shrinking of the sheets after application, as commonly occurs with wallpapers, is avoided. Thus, edge matching of adjacent sheets may be easily obtained. Alternatively, edge matching issues may be avoided merely by overlapping adjacent sheets.

In view of the above, it will be apparent that the articles according to the present invention may be formed by a variety of methods and techniques. One such method is disclosed herein for illustrative purposes only. More particularly, with reference to FIG. 4, a small, laboratory scale, semi-automated process is shown. A releasable liner 100 is provided in roll form and is unrolled to travel through assembly 102 via rollers 104, 106, 108, 110, 112 and 114 to form a completed article 116 which is wound on roll 118. As will be described in further detail below, trimmed portions 120 are directed to roll 122. The releasable liner 100 is pulled as a web 101 through the assembly by a combination of the rolls 118 and 122 and a conveyer 124, for example a vacuum conveyor. A suitable vacuum conveyor may comprise a continuous conveyor belt with two pulleys having an array of spaced holes that are exposed to the vacuum chamber immediately below. Negative pressure (vacuum) is created by a forced air blower. As the belt passes over the chamber, a negative pressure is created at each hole such that the releasable liner 100 is securely held to the belt as it passes over the belt. This effect assists in preventing wrinkles in the releasable liner 100 as the applied color component dries. The vacuum conveyor belt speed may be matched to that of the drive rolls 118 and 122 driven by a drive 119. The shaft of a roller 126 from which the releasable liner 100 is supplied is connected with a friction clutch 128 which may be adjusted to obtain sufficient tension in the web 101 for smooth travel through the process. A Fife guiding unit 130 may be provided to track the web travel through the assembly.

Figure 4:
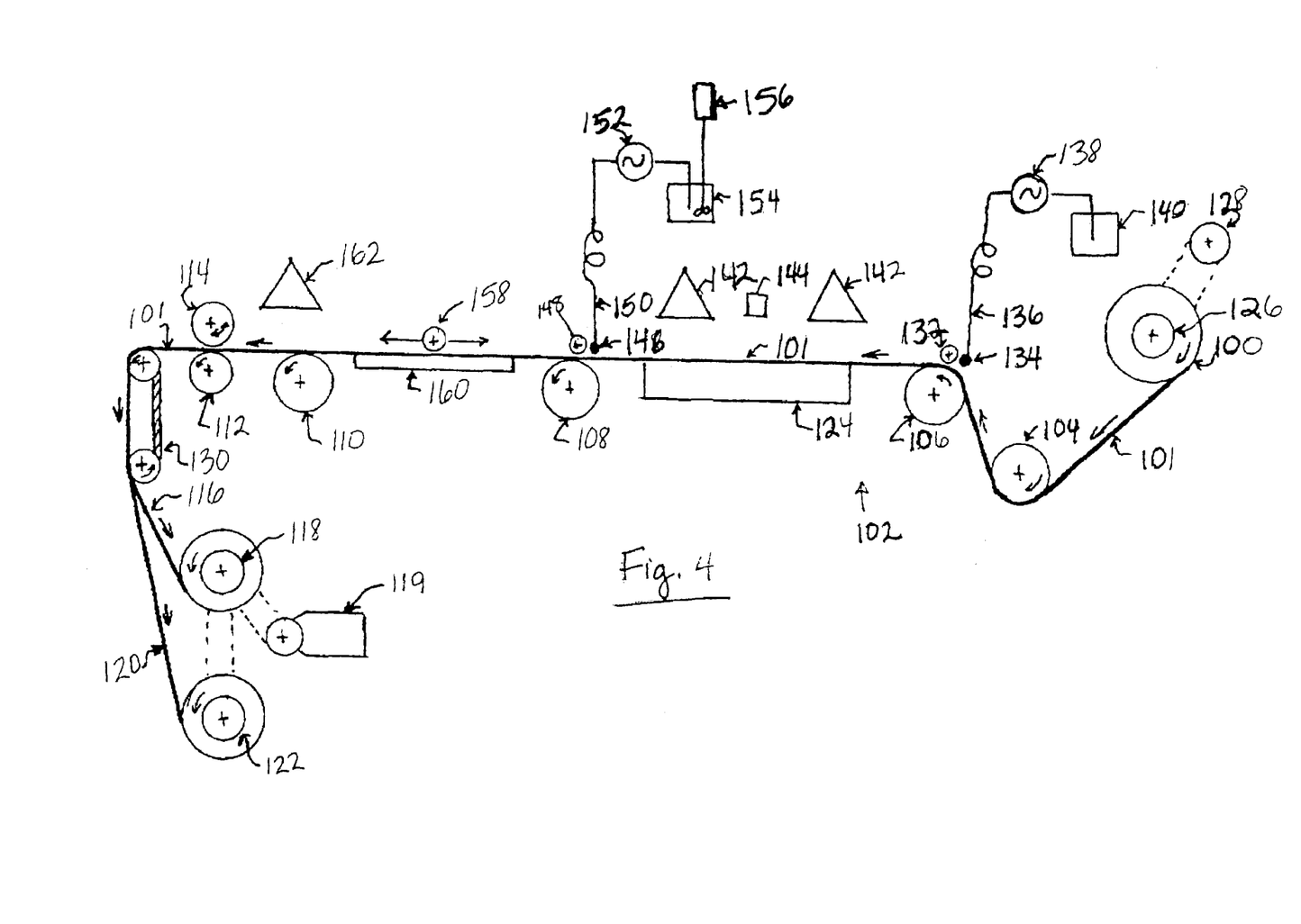
FIG. 4 sets forth a schematic diagram of one process for producing an article for applying color on a surface according to the present invention.

A color component such as wet paint is applied to the web 101 of the releasable liner adjacent roller 106 using an applicator 132. The paint or other color component may be water-based or solvent-based as desired. In one embodiment, the applicator 132 comprises a #50 wire wound rod which may be held against the roller 106 by spring tension or the like such that the web 101 passes between the roller 106 and the applicator 132. The color component such as paint is introduced at the upstream side of the wire wound rod applicator 132 by a manifold 134. The manifold is fed by tubing 136 from a peristaltic pump 138 which draws the wet paint from a reservoir 140. To form the sheet of dry color component, the paint is dried on the web 101, for example as it passes over the vacuum conveyor 124 by the use of dryers. In the embodiment of FIG. 4, the dryers comprise two infrared heaters 142 which are aided by a forced ambient air duct 144. The air duct 144 may conveniently blow the exhaust from the vacuum conveyor 124. One skilled in the art will readily appreciated that solvent or other carrier removed during the drying process may be captured and recycled as desired. A sheet of dry color component is thus formed on the releasable liner web.

An adhesive is then applied to the sheet of dry color component on the surface opposite the releasable liner. For example, in the assembly 102 of FIG. 4, adhesive is applied to the surface of the sheet of dry color component on the web 101 at roller 108 by an applicator 148 which may comprise, for example, a #20 wire wound rod. The wire wound rod applicator 148 may be held against the roller 108 by spring tension or the like such that the web 101 passes between the roller and the applicator. Liquid adhesive is introduced at the upstream side of the wire wound rod applicator 148 by a manifold 146. The manifold 146 is fed by tubing 150 from a peristaltic pump 152 which draws the liquid adhesive from a reservoir 154. The liquid adhesive in a reservoir 154 is continuously stirred by a mixer 156. With the adhesive applied thereon, the web 101 travels to an oscillating fabric covered roller 158 which traverses back and forth in the machine direction above a slider plate 160 to impart a texture to the liquid adhesive applied to the sheet of dry color component on the web 101. A textured adhesive may allow the article to be more easily repositioned prior to permanent bonding. The adhesive is then dried, for example, by passing the web 101 under an infrared heater 162 at roller 110.

In a preferred embodiment, the web 101 travels through rollers 112 and 114, one of which is preferably in the form of a rotary cutting knife. In a more specific embodiment, roller 114 comprises two rotary cutting knives which are arranged adjacent the edges of the web in order to trim the web edges and provide the final article with the homogenous edges. In another embodiment, the roller 114 comprises a plurality of rotary cutting knife sets which are arranged so as to cut the web into two or more strips to provide smaller sized articles adapted for applying color to smaller sized areas as discussed above. The resulting article 116 is then wound on the roll 118 while the trimmed edges 120 are wound on the roll 122. As set forth above, the described assembly 102 and preparation process is illustrative only and variations thereof will be apparent to those skilled in the art. For example, release agents in the form of coatings, layers or the like may be provided in the process. Additionally, the sheet of dry color component may be provided in the final article in the absence of a release liner. For example, the sheet of dry color component may be formed on a processing web or forming belt and then separated from the processing web or forming belt prior to storage in roll or sheet form.

Figure 2A:
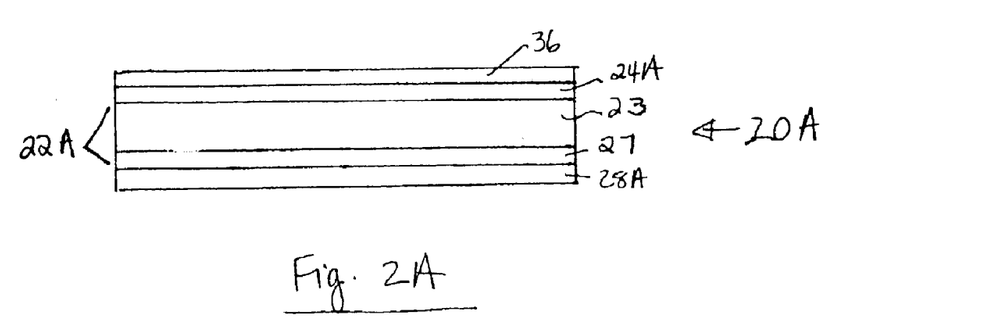
FIG. 2A sets forth a schematic diagram of another embodiment of an article for applying color on a surface according to the present invention.

In an alternate embodiment, the articles according to the invention as set forth, for example, in FIG. 2A may be formed using a modified version of the process as described above wherein two releasable liner webs are employed. For example, with reference to FIG. 2A, a topcoat composition for forming topcoat layer 27 may be applied to a releasable liner web by reverse roll, extrusion coating or the like techniques, and dried thereon, for example with heat. A color component may then be applied to the dried topcoat layer, for example by reverse roll, gravure coating, printing, or the like techniques, and dried with heat. The adhesive may then be applied to a second releasable liner web, followed by laminating the releasable liner-topcoat-dry color component member with the adhesive-releasable liner member, with the dry color component and adhesive in facing relationship. Heat may be provided throughout this process by any suitable means including convection or radiation, for example infrared, ultraviolet or the like. One of ordinary skill in the art will also appreciate that this method may be used to provide an article including a single releasable liner, for example as set forth in FIG. 2, by merely removing the second releasable liner from the adhesive once the releasable liner-topcoat-dry color component member and the adhesive-releasable liner member have been assembled.

Additional or alternative apparatus and/or processing steps will be apparent to one skilled in the art in view of this description and are within the scope of the present invention. For example, the color component or adhesive could be applied as a single layer or in multiple layers using a variety of known application techniques including extrusion, spraying, printing, reverse roll, gravure coating, roll application and others known in the art. The layers may have the same properties or various layers, different from each other, may be employed to combine various properties such as color, strength, opacity, and the like. A blocking agent as described above may be applied to the adhesive surface and/or may be mixed with the adhesive. Heating may be provided by infrared, convection, or radiation apparatus or other techniques known in the art. Texturization may be provided on or in one or more layers of the article.

The specific illustrations and embodiments described herein are exemplary only in nature and are not intended to be limiting of the invention defined by the claims. Further embodiments and examples will be apparent to one of ordinary skill in the art in view of this specification and are within the scope of the claimed invention.

What is claimed is:

1. An article for applying color to an interior architectural surface, said article having a length and a width, and comprising:
    (a) a sheet of dry color component having two surfaces, said sheet of dry color component comprising at least one layer of dry paint or dry ink; and
    (b) a repositionable adhesive on one surface of the sheet of dry color component, wherein
        (i) said adhesive has a first tack at room temperature in response to a first condition, said first tack being suitable to repositionably adhere said article to an interior architectural surface and to the sheet of dry color component of a second article for applying color to an interior architectural surface without damaging said article for applying color to an architectural surface or said second article; and
        (ii) the adhesive has a second tack at room temperature in response to a second condition, wherein said second tack is greater than said first tack and is suitable for forming a permanent bond to an interior architectural surface and to the sheet of dry color component of a second article for applying color to an interior architectural surface; and
    wherein the sheet of dry color component and the adhesive have a combined thickness of about 3.3 mils or less, and the sheet of dry color component is extensible to allow bending and rolling without cracking, breaking, or other damage to the sheet of dry color component and exhibits a maximum elongation of less than 50% according to ASTM D822, and
    said article is configured for application to an architectural surface in side-by-side sheets, which may at least partially overlap, to form a continuous layer of color on the architectural surface, wherein said article is opaque along its length and across its width, and said article has an opacity index of at least about 0.95 as measured according to ASTM D2805 to provide opacity coverage to the architectural surface to which it is applied and the sheet of dry color component has a specular reflectance of less than about 60 gloss units at 60 degrees.

2. The article according to claim 1 wherein the sheet of dry color component comprises an opacifying layer, wherein said opacifying layer comprises a film selected from the group consisting of: polymeric films, metallic films, and combinations thereof.

3. The article according to claim 1 further comprising an opacifying agent, wherein said opacifying agent is in the adhesive.

4. The article according to claim 1, wherein the sheet of dry color component comprises a topcoat on a surface opposite the adhesive.

5. An article according to claim 1 further comprising a releasable liner being releasably adhered to the side of the sheet of dry color component opposite the adhesive layer.

6. The article according to claim 5 wherein a release agent is provided between the releasable liner and the sheet of dry color component.

7. The article according to claim 5 wherein a surface of the releasable liner opposite the sheet of dry color component has a release agent thereon.

8. The article according to claim 1 wherein the adhesive comprises a pressure sensitive adhesive.

9. The article according to claim 8, wherein the adhesive is provided with a blocking agent at a surface thereof, wherein said blocking agent is selected from the group consisting of: starch, talc, silicon dioxide, titanium dioxide, zeolite, polymers, glass, ceramic and mixtures thereof.

10. The article according to claim 1 wherein the sheet and adhesive provide a surface covering having a water vapor transmission rate of greater than about 1 g-μm/cm$^2$/24 hrs.

11. An article according to claim 1 wherein the sheet of dry color component is extensible to allow bending and rolling without cracking, breaking, or other damage to the sheet of dry color component and exhibits a maximum elongation of 25% or less according to ASTM D822.

12. An article according to claim 1 wherein one of the surfaces of the sheet of dry color component is adjacent said adhesive, and said sheet of dry color component includes a backing layer at said surface adjacent said adhesive, wherein said backing layer provides structural support to the sheet of dry color component, and said backing layer is non-removable from said sheet of dry color component.

13. An article according to claim 1 wherein said sheet of dry color component is microconformable in that said article has properties which allow it to become similar in character to the architectural surface to which it is adhered, wherein the sheet of dry color component mimics the texture of the underlying architectural surface to provide the architectural surface with a paint-like appearance.

14. The article according to claim 1 wherein the sheet of dry color component comprises a single, solid homogeneous color.

15. The article according to claim 1 wherein the sheet of dry color component comprises a regular pattern of two or more color components and/or layers of color components.

16. The article according to claim 1 wherein the sheet of dry color component comprises an irregular pattern of two or more color components and/or layers of color components.

17. The article according to claim 1 wherein the article proves a faux finish comprising a non-homogeneous decorative effect.

18. The combination of an article according to claim 1 and a textured architectural surface wherein said sheet of dry color component is microconformable in that said article has properties which allow it to become similar in character to the architectural surface to which it is adhered, wherein the sheet of dry color component mimics the texture of the underlying architectural surface to provide a paint-like appearance to said architectural surface.

19. An article for applying color on an architectural surface, said article having a length and a width, and comprising:
(a) a sheet of dry color component having two surfaces, said sheet of dry color component comprising at least one layer of dry paint or dry ink, said sheet of dry color component comprising (i) a pigment, dye, or combination thereof, and (ii) a topcoat layer;
(b) a repositionable pressure sensitive adhesive on a surface of the sheet of dry colorant opposite the topcoat layer, wherein
(i) said adhesive has a first tack at room temperature in response to a first condition, said first tack being suitable to repositionably adhere said article to an interior architectural surface and to the sheet of dry color component of a second article for applying color to an interior architectural surface without damaging said article for applying color to an architectural surface or said second article; and
(ii) the adhesive has a second tack at room temperature in response to a second condition, wherein said second tack is greater than said first tack and is suitable for forming a permanent bond to an interior architectural surface and to the sheet of dry color component of a second article for applying color to an interior architectural surface; and
(c) a releasable liner, wherein the sheet of dry color component is arranged between the releasable liner and the adhesive, the releasable liner having a release agent on its surface adjacent the sheet of dry color component;
wherein the sheet of dry color component and the adhesive have a combined thickness of about 3.3 mils or less; and
wherein the sheet of dry color component is extensible to allow bending and rolling without cracking, breaking, or other damage to the sheet of dry color component and exhibits a maximum elongation of less than 25% according to ASTM D822; and
said article is configured for application to an architectural surface in side-by-side sheets, which may at least partially overlap, to form a continuous layer of color on the architectural surface, and said article is opaque along its length and across its width, wherein said article has an opacity index of at least about 0.95 as measured according to ASTM D2805 to provide opacity coverage to the architectural surface to which it is applied and the sheet of dry color component has a specular reflectance of less than about 60 gloss units at 60 degrees.

20. An architectural surface covering product for applying color to an architectural surface, the architectural surface covering product having a length and a width, and comprising a flexible and conformable film for application to an architectural surface in side-by-side sheets, which sheets at least partially overlap, to form a continuous layer of color along the length and across the width of the architectural surface, said architectural surface covering product comprising:
(a) a sheet of dry color component having two surfaces comprising an inside surface and an outside surface, said sheet of dry color component comprising at least one layer of dry paint or dry ink, said sheet of dry color component comprising a pigment, dye or combinations thereof;
(b) a repositionable pressure sensitive adhesive on the inside surface of the sheet of dry color component, wherein there is an opacifying agent disposed in said adhesive, and
(i) said adhesive has a first tack at room temperature in response to a first condition, said first tack being suitable to repositionably adhere said article to an interior architectural surface and to the sheet of dry color component of a second article for applying color to an interior architectural surface without damaging said article for applying color to an architectural surface or said second article; and (ii) the adhesive has a second tack at room temperature in response to a second condition, wherein said second tack is greater than said first tack and is suitable for forming a permanent bond to an interior architectural surface and to the sheet of dry color component of a second article for applying color to an interior architectural surface; and (c) a releasable liner comprising a film, said releasable liner being releasably adhered to the outside surface of the sheet of dry color component opposite the adhesive layer; and (d) a release agent, said release agent being disposed on said outer surface of said releasable liner, wherein:

(i) the sheet of dry color component and the adhesive have a combined thickness of about 3.3 mils or less;

(ii) the sheet of dry color component with the adhesive thereon is extensible to allow bending and rolling without cracking, breaking, or other damage to the sheet of dry color component and exhibits a maximum elongation of less than 25% when measured according to ASTM D882;

(iii) said article is opaque along its length and across its width, wherein the combination of the sheet of dry color component and the adhesive have an opacity index of at least about 0.98 to provide opacity coverage to the architectural surface to which it is applied;

(iv) the sheet of dry color component has a specular reflectance of less than about 60 gloss units at 60 degrees; and (v) said sheet of dry color component comprises an irregular pattern of two or more color components and/or layers of color components.

21. An architectural surface covering product according to claim 20 wherein said sheet of dry color component and the adhesive provide a surface covering having a water vapor transmission rate of at least 1 g/μm/cm$^2$/24 hrs. at 100% RH and 40° C.

22. An article comprising the combination of an architectural surface covering product applied to an architectural surface, comprising:

(a) an architectural surface;

(b) a first sheet of an architectural surface covering product comprising a flexible and conformable film, and having a length, a width, and edges, said first sheet of architectural surface covering product comprising:

(i) a sheet of dry color component having two surfaces, said sheet of dry color component comprising at least one layer of dry paint or dry ink; and (ii) adhesive on one surface of the sheet of dry color component, wherein the sheet of dry color component and the adhesive of said first sheet of architectural surface covering product have a combined thickness of about 3.3 mils or less, wherein said first sheet of architectural surface covering product is opaque along its length and across its width, and said first sheet of architectural surface covering product has an opacity index of at least about 0.95 as measured according to ASTM D2805 to provide opacity coverage to the architectural surface to which it is applied and the sheet of dry color component has a specular reflectance of less than about 60 gloss units at 60 degrees, and said first sheet of architectural surface covering product is joined by its adhesive surface to said architectural surface; and (c) a second sheet of an architectural surface covering product comprising a flexible and conformable film, and having a length, a width, and edges, said second sheet of architectural surface covering product comprising:

(i) a sheet of dry color component having two surfaces, said sheet of dry color component comprising at least one layer of dry paint or dry ink; and (ii) adhesive on one surface of the sheet of dry color component, wherein the sheet of dry color component and the adhesive of said second sheet of architectural surface covering product have a combined thickness of about 3.3 mils or less, wherein said second sheet of architectural surface covering product is opaque along its length and across its width, and said second sheet of architectural surface covering product has an opacity index of at least about 0.95 as measured according to ASTM D2805 to provide opacity coverage to the architectural surface to which it is applied and the sheet of dry color component has a specular reflectance of less than about 60 gloss units at 60 degrees;

wherein said second sheet of architectural surface covering product is joined by its adhesive surface to said architectural surface so that one of the edges of said second sheet of architectural surface covering product overlaps an edge of said first sheet of architectural surface covering product.

* * * * *

UNITED STATES PATENT AND TRADEMARK OFFICE
CERTIFICATE OF CORRECTION

PATENT NO. : 7,622,175 B2 Page 1 of 1
APPLICATION NO. : 10/324237
DATED : November 24, 2009
INVENTOR(S) : Pallotta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 840 days.

Signed and Sealed this

Twenty-sixth Day of October, 2010

David J. Kappos
*Director of the United States Patent and Trademark Office*